United States Patent
Uptain et al.

(10) Patent No.: US 8,692,006 B2
(45) Date of Patent: Apr. 8, 2014

(54) THERMAL METHODS FOR TREATING A METATHESIS FEEDSTOCK

(75) Inventors: Kevin D. Uptain, Edina, MN (US); Charles Tanger, Minneapolis, MN (US); Hiroki Kaido, Eden Prairie, MN (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 340 days.

(21) Appl. No.: 12/672,652

(22) PCT Filed: Aug. 11, 2008

(86) PCT No.: PCT/US2008/009604
§ 371 (c)(1),
(2), (4) Date: Sep. 7, 2011

(87) PCT Pub. No.: WO2009/020665
PCT Pub. Date: Feb. 12, 2009

(65) Prior Publication Data
US 2011/0313180 A1   Dec. 22, 2011

Related U.S. Application Data

(60) Provisional application No. 60/964,186, filed on Aug. 9, 2007.

(51) Int. Cl.
*C11B 3/00* (2006.01)

(52) U.S. Cl.
USPC .......................................... 554/124

(58) Field of Classification Search
USPC .......................................... 554/124
See application file for complete search history.

(56) References Cited

U.S. PATENT DOCUMENTS

| | | | |
|---|---|---|---|
| 2,190,593 | A | 2/1940 | Clayton |
| 4,613,410 | A | 9/1986 | Rivers, Jr. |
| 5,091,116 | A | 2/1992 | Krishnamurthy et al. |
| 5,298,271 | A | 3/1994 | Takashina et al. |
| 5,298,638 | A | 3/1994 | Toeneboehn et al. |
| 5,348,755 | A | 9/1994 | Roy |
| 5,374,751 | A | 12/1994 | Cheng et al. |
| 5,391,385 | A | 2/1995 | Seybold |
| 5,401,866 | A | 3/1995 | Cheng et al. |
| 5,432,083 | A | 7/1995 | Copeland et al. |
| 5,484,201 | A | 1/1996 | Goolsbee |
| 5,532,163 | A | 7/1996 | Yagi et al. |
| 5,560,950 | A | 10/1996 | Conte et al. |
| 5,597,600 | A | 1/1997 | Munson et al. |
| 5,653,966 | A | 8/1997 | Bertoli et al. |
| 5,824,354 | A | 10/1998 | Ritter et al. |
| 5,932,261 | A | 8/1999 | Unnithan |
| 5,959,129 | A | 9/1999 | Van Dam et al. |
| 6,033,706 | A | 3/2000 | Silkeberg et al. |
| 6,129,945 | A | 10/2000 | Awad et al. |
| 6,162,480 | A | 12/2000 | Van Buuren et al. |
| 6,166,279 | A | 12/2000 | Schwab et al. |
| 6,172,248 | B1 | 1/2001 | Copeland et al. |
| 6,207,209 | B1 | 3/2001 | Jirjis et al. |
| 6,210,732 | B1 | 4/2001 | Papanton |
| 6,248,911 | B1 | 6/2001 | Canessa et al. |
| 6,251,460 | B1 | 6/2001 | Ganguli et al. |
| 6,368,648 | B1 | 4/2002 | Bertram et al. |
| 6,552,208 | B1 | 4/2003 | Alander et al. |
| 6,638,551 | B1 | 10/2003 | Levy et al. |
| 6,706,299 | B2 | 3/2004 | Thengumpillil et al. |
| 6,740,134 | B2 | 5/2004 | Angelico et al. |
| 6,800,316 | B1 | 10/2004 | Perrut et al. |
| 6,833,149 | B2 | 12/2004 | Jirjis et al. |
| 6,900,347 | B2 * | 5/2005 | Paulson et al. ............. 560/261 |
| 6,998,050 | B2 | 2/2006 | Nakajoh et al. |
| 7,060,316 | B2 | 6/2006 | Sakai et al. |
| 7,141,083 | B2 | 11/2006 | Jordan |
| 7,144,433 | B2 | 12/2006 | Jordan |
| 7,144,435 | B2 | 12/2006 | Jordan |
| 7,160,338 | B2 | 1/2007 | Jordan |
| 7,160,339 | B2 | 1/2007 | Jordan |
| 7,220,289 | B2 | 5/2007 | Jordan |
| 7,320,809 | B2 | 1/2008 | Friedman et al. |
| 7,576,227 | B2 | 8/2009 | Lysenko et al. |
| 7,597,783 | B2 | 10/2009 | Kruidenberg |
| 7,598,407 | B2 | 10/2009 | Kruidenberg |
| 2005/0154221 | A1 * | 7/2005 | Lysenko et al. ............. 554/174 |

FOREIGN PATENT DOCUMENTS

| | | |
|---|---|---|
| EP | 0 116 408 A2 | 8/1984 |
| WO | WO 2006/052688 A2 | 5/2006 |
| WO | WO 2007/081987 A2 | 7/2007 |
| WO | WO2007081987 A * | 7/2007 |
| WO | WO 2009/007234 A1 | 1/2009 |
| WO | WO 2009/020667 A1 | 2/2009 |

OTHER PUBLICATIONS

U.S. Appl. No. 12/672,651, filed Feb. 8, 2010, Lemke et al.
International Search Report and Written Opinion of the International Searching Authority for International Application No. PCT/US2008/009604, dated Oct. 27, 2008, 5 pages.
Erhan et al. , "Drying Properties of Metathesized Soybean Oil," Journal of American Oil Chemists' Society, AOCS Press, vol. 74, No. 6, 1997, pp. 703-706.
Helme, Jean-Paul, "Soybean Oil Refining," American Soybean Association, 1984, 37 pages.
Extended European Search Report for European Application No. 08795212.3, dated Sep. 10, 2013, 7 pages.

* cited by examiner

*Primary Examiner* — Deborah D Carr
(74) *Attorney, Agent, or Firm* — Brinks Gilson & Lione

(57) ABSTRACT

Various methods are provided for metathesizing a feedstock. In one aspect, a method includes providing a feedstock comprising a natural oil, heating the feedstock to a temperature greater than 100° C. in the absence of oxygen, holding the feedstock at the temperature for a time sufficient to diminish catalyst poisons in the feedstock, and, following the heating and holding, combining a metathesis catalyst with the feedstock under conditions sufficient to metathesize the feedstock.

20 Claims, No Drawings

THERMAL METHODS FOR TREATING A METATHESIS FEEDSTOCK

RELATED APPLICATIONS

This application is a national application filed under 35 USC §371 of International Application No. PCT/US2008/009604, filed Aug. 11, 2008, which claims the benefit of U.S. Provisional Patent Application Ser. No. 60/964,186, filed Aug. 9, 2007, which are incorporated herein by reference.

TECHNICAL FIELD

This application relates to metathesis reactions and, in particular, to methods of improving catalyst performance in a metathesis reaction of a natural feedstock.

BACKGROUND OF THE INVENTION

Metathesis is a chemical process that is generally known in the art. Metathesis is a catalytic reaction that involves the interchange of alkylidene units among compounds containing one or more double bonds (e.g., olefinic compounds) via the formation and cleavage of the carbon-carbon double bonds. Metathesis may occur between two like molecules (often referred to as self-metathesis) and/or it may occur between two different molecules (often referred to as cross-metathesis). Self-metathesis may be represented schematically as shown in Equation I.

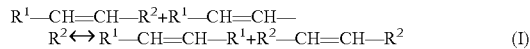
(I)

wherein $R^1$ and $R^2$ are organic groups.

Cross-metathesis may be represented schematically as shown in Equation II.

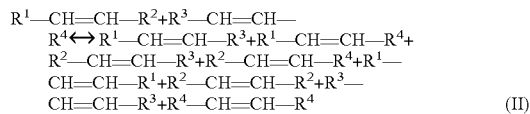
(II)

wherein $R^1$, $R^2$, $R^3$, and $R^4$ are organic groups.

In recent years, there has been an increased demand for environmentally friendly techniques for manufacturing materials typically derived from petroleum sources. For example, researchers have been studying the feasibility of manufacturing waxes, plastics, and the like, using vegetable and seed-based oils. In one example, metathesis catalysts are used to manufacture candle wax, as described in PCT/US 2006/000822, which is herein incorporated by reference. Metathesis reactions involving natural feedstocks offer promising solutions for today and for the future.

Natural feedstocks of interest typically include, for example, natural oils (e.g., vegetable oils, fish oil, animal fats) and derivatives of natural oils, such as fatty acids and fatty acid alkyl (e.g., methyl) esters. These feedstocks may be converted into industrially useful chemicals (e.g., waxes, plastics, cosmetics, biofuels, etc.) by any number of different metathesis reactions. Significant reaction classes include, for example, self-metathesis, cross-metathesis with olefins, and ring-opening metathesis reactions. Representative examples of useful metathesis catalysts are provided below. Metathesis catalysts can be expensive and, therefore, it is desirable to improve the efficiency of the metathesis catalyst. The inventors have discovered new methods of increasing catalyst efficiency which involve purifying the naturally-derived metathesis feedstocks.

Catalyst efficiency and product conversion can vary dramatically depending on the purity of the feedstock that is being metathesized. One of the challenges with using natural feedstocks is that naturally-derived feedstocks may include impurities, sometimes in trace amounts, that do not exist in petroleum feedstocks. These impurities often react with the metathesis catalyst and may drastically affect the efficiency of the catalyst and metathesis reaction. Moreover, the presence and level of various impurities in natural oils may vary from batch-to-batch, depending, for example, on the geographic location of the harvest, and even on the specific field of harvest as well as other growing conditions.

BRIEF SUMMARY OF THE INVENTION

The present invention is a method is provided for metathesizing a feedstock. The method comprises providing a feedstock comprising a natural oil. The method further comprises heating the feedstock to a temperature greater than 100° C. in the absence of oxygen. The method further comprises holding the feedstock at the temperature for a time sufficient to diminish catalyst poisons in the feedstock. The method further comprises combining a metathesis catalyst with the feedstock under conditions sufficient to metathesize the feedstock.

In another aspect, the method comprises providing a feedstock comprising a natural oil. The method further comprises heating the feedstock to a temperature greater than 100° C. in the absence of oxygen for a time sufficient to diminish non-peroxide poisons in the feedstock. The method further comprises combining a metathesis catalyst with the feedstock under conditions sufficient to metathesize the feedstock.

In another aspect, the method comprises providing a feedstock comprising a natural oil. The feedstock has a starting peroxide value. The method further comprises heating the feedstock for a time sufficient to diminish the starting peroxide value of the feedstock by approximately 80% or more. The method further comprises combining a metathesis catalyst with the feedstock under conditions sufficient to metathesize the feedstock.

DETAILED DESCRIPTION OF THE INVENTION

The present application relates to treatment of metathesis feedstocks. Such treatments, which remove harmful catalyst poisons, are conducted prior to introducing a metathesis catalyst, thereby improving metathesis catalyst performance. Exemplary feedstocks may include natural oils.

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the term "metathesis catalyst" includes any catalyst or catalyst system that catalyzes a metathesis reaction.

As used herein, the term "natural oil" or "natural feedstock" refers to an oil derived from a plant or animal source. The term "natural oil" includes natural oil derivatives, unless otherwise indicated. Examples of natural oils include, but are not limited to, vegetable oils, algae oils, animal fats, tall oils, derivatives of these oils, combinations of any of these oils, and the like. Representative examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, and castor oil. Representative examples of animal fats include lard, tallow, chicken fat, yellow grease, and fish oil. Tall oils are by-products of wood pulp manufacture.

As used herein, the term "natural oil derivatives" refers to the compounds or mixture of compounds derived from the natural oil using any one or combination of methods known in the chemical arts. Such methods include saponification, esterification, hydrogenation (partial or full), isomerization, oxidation, and reduction. For example, the natural oil derivative may be a fatty acid methyl ester (FAME) derived from the glyceride of the natural oil. Representative examples of natural oil derivatives include fatty acids and fatty acid alkyl (e.g., methyl) esters of the natural oil. In some preferred embodiments, a feedstock may include canola or soybean oil, for example, refined, bleached, and deodorized soybean oil (i.e., RBD soybean oil). Soybean oil is an unsaturated polyol ester of glycerol that typically comprises about 95% weight or greater (e.g., 99% weight or greater) triglycerides of fatty acids. Major fatty acids in the polyol esters of soybean oil include saturated fatty acids, for example, palmitic acid (hexadecanoic acid) and stearic acid (octadecanoic acid), and unsaturated fatty acids, for example, oleic acid (9-octadecenoic acid), linoleic acid (9,12-octadecadienoic acid), and linolenic acid (9,12,15-octadecatrienoic acid).

As used herein, the term "catalyst poison" includes any chemical species or impurity in a feedstock that reduces or is capable of reducing the functionality (e.g., efficiency, conversion, turnover number) of the metathesis catalyst. The term "turnover number" or "catalyst turnover" generally refers to the number of moles of feedstock that a mole of catalyst can convert before becoming deactivated.

As used herein, the term "peroxides" includes any and all peroxides, such as hydrogen peroxides, unless indicated otherwise.

As used herein, the term "non-peroxide poisons," or "other catalyst poisons," refers to catalyst poisons other than peroxides that may be found in natural oil feedstocks. These non-peroxide poisons include, but are not limited to, water, aldehydes, alcohols, byproducts from oxidative degradation, terminal conjugated polyenes, free fatty acids, free glycerin, aliphatic alcohols, nitriles, esters with unsaturated groups near ester groups, d-sphingosine, and additional impurities, including "color bodies." Examples of "color bodies" include trace impurities such as indanes, naphthalenes, phenanthrenes, pyrene, alkylbenzenes, and the like.

As used herein, the term "adsorbent" refers to any material or substance that is used, or that may be used, to absorb or adsorb another material or substance and includes solid, liquid, and gaseous absorbents and adsorbents.

As used herein, the term "catalyst efficiency" is defined as the percent conversion of feedstock and is measured by the GC-analysis of transesterified products, as described below.

As used herein, the term "maximum theoretical limit" or "maximum theoretical conversion limit" refers to the apparent maximum feedstock conversion determined through GC-analysis. For each metathesis reaction, there is a minimum catalyst loading amount required to achieve the maximum theoretical limit. Any increase in catalyst loading beyond this minimum loading will not improve conversion. Additionally, no amount of treatment to remove catalyst poisons will improve conversion beyond the maximum theoretical conversion limit. It is noted that different natural oil feedstocks may have different maximum theoretical conversion limits. Additionally, a particular feedstock may have a different maximum theoretical conversion limits based upon the type of metathesis reaction that the feedstock undergoes (cross-v. self-metathesis). For example, based upon experimental data, self-metathesis of a soybean oil derivative has a maximum theoretical conversion limit of approximately 70%.

As used herein, the terms "metathesize" and "metathesizing" refer to the reacting of a feedstock in the presence of a metathesis catalyst to form a metathesis product comprising a new olefinic compound. Metathesizing may refer to cross-metathesis (a.k.a. co-metathesis), self-metathesis, ring-opening metathesis, ring-opening metathesis polymerizations (ROMP), ring-closing metathesis (RCM), and acyclic diene metathesis (ADMET). For example, metathesizing may refer to reacting two of the same triglycerides present in a natural feedstock (self-metathesis) in the presence of a metathesis catalyst, wherein each triglyceride has an unsaturated carbon-carbon double bond, thereby forming two new olefinic molecules which may include a dimer of the triglyceride. Additionally, metathesizing may refer to reacting an olefin, such as ethylene, and a triglyceride in a natural feedstock having at least one unsaturated carbon-carbon double bond, thereby forming two new olefinic molecules (cross-metathesis).

The presence and level of various impurities for natural oils may vary from location-to-location, field-to-field, or batch-to-batch. It may be difficult to predict the presence or level of certain impurities in the natural oil feedstock without extensive testing on each batch. Accordingly, it is important to be able to design a robust treatment for the various natural oil feedstocks with varying levels of impurities in order to diminish the impurities and improve catalyst performance and product conversion. As seen in the examples below, natural feedstocks have varying levels of peroxide impurities. Typically, the natural oil feedstock may have a peroxide value greater than 1 milliequivalent per 1000 g of feedstock (meq/kg). Typical peroxide values may be greater than 10 meq/kg. Food grade natural oils typically have relatively low peroxide values, closer to 1 meq/kg. Industrial grade natural oils or fatty acid methyl esters of natural oils typically have higher peroxide values. Based upon these examples for the fatty acid methyl esters of soybean and canola oil, the starting peroxide value is typically greater than 5 milliequivalents per 1000 g of feedstock (meq/kg). Examples also show that fatty acid methyl esters of a natural oil may exceed 10 meq/kg.

The inventors have discovered that catalyst efficiency may be greatly improved using thermal techniques to treat a natural feedstock. In one embodiment, catalyst poisons may be diminished by thermally treating the feedstock prior to introducing the metathesis catalyst to the feedstock. Thermal treatment may target metathesis catalysts poisons, including peroxides. The inventors have discovered that peroxides are strongly correlated with catalyst efficiency and turnover. This may indicate that peroxides are a significant catalyst poison. Additionally, the inventors have discovered that such treatments also appear to target and react with other, non-peroxide, catalyst poisons, rendering them inactive. The inventors have also discovered that treatment of a natural oil feedstock with a low starting peroxide value (e.g., <1 meq/kg) is capable of improving catalyst efficiency and turnover, indicating that while peroxide value is an important measure of feedstock quality, it is not the only factor.

Thermal treatment may generally comprise several steps. First, oxygen is removed from the feedstock. This step is important to limit the creation of certain catalyst poisons such as peroxides. For example, peroxides can be created through oxidation at the carbon-carbon double bond of the unsaturated fatty acids in the feedstock. Oxygen may be removed from the feedstock by pulling a vacuum on the feedstock to clear any oxygen in the headspace and remove any dissolved oxygen within the feedstock. Alternatively, oxygen may be removed by sparging the feedstock with an inert gas, such as nitrogen.

Next, the feedstock is heated to an elevated temperature, for a time sufficient to achieve thermal decomposition of catalyst poisons. While the feedstock is being heated, the feedstock is preferably kept under vacuum or under the pressure of an inert gas. The inventors have discovered that heating the feedstock to a temperature greater than 100° C. is necessary to achieve efficient decomposition of the catalyst poisons found in natural feedstocks. More preferably, the temperature is about 120° C. or greater. Even more preferably, the temperature is about 150° C. or greater.

Additionally, it is preferable that the temperature be approximately 300° C. or less. More preferably, the temperature is approximately 250° C. or less. Even more preferably, the temperature is approximately 210° C. or less.

Catalyst poisons, such as peroxides, degrade when exposed to high temperatures for sufficient time. In order to maximize decomposition of the catalyst poisons, the feedstock is maintained at an elevated temperature for a sufficient period of time. The hold time will vary depending on, among other variables, the temperature of the thermal treatment. In general, higher thermal treatment temperatures will typically require shorter hold times. At elevated temperatures above 100° C., the catalyst poisons are capable of decomposing in a matter of hours or minutes, as opposed to days. Preferably, the hold time for the temperature ranges described above will be less than one day. More preferably, the hold time will be less than one hour. Even more preferably, the hold time will be a matter of minutes.

In preferred embodiments, the thermal treatment diminishes the peroxide level in the feedstock to less than 1 meq/kg, and more preferably, less than 0.5 meq/kg. In some circumstances, for example when the peroxide value of the feedstock is greater than 5 meq/kg, it may be preferable to diminish the level of peroxides by approximately 80% or more, or by approximately 90% or more. In some circumstances, for example where the feedstock has a starting peroxide value that is greater than 10 meq/kg, it may be preferable to diminish the level of peroxides by approximately 90% or more, or by approximately 95% or more.

The methods may be used to diminish the amount of metathesis catalyst poisons in metathesis feedstocks. This allows metathesis feedstocks prepared in accordance with the methods to be metathesized at a high turnover number of the metathesis catalyst. In other words, diminishing catalyst poisons may assist in improvement to the catalyst efficiency and conversion.

By thermally treating the feedstock, the reduction in catalyst poisons will improve feedstock conversion, and allow the opportunity to decrease catalyst loading. This is particularly desirable due to the high costs associated with typical metathesis catalysts.

In some preferred embodiments, a metathesis reaction may catalyze the metathesis of at least 50% of the maximum theoretical conversion limit with a catalyst loading of 30 ppm or less per mol of carbon-carbon double bonds in the feedstock ("ppm/db"). For example, if the maximum theoretical conversion limit is 70% of the feedstock, it is preferable to catalyze or convert at least 35% of the feedstock (35/70=50%). A 50% or greater conversion of the maximum theoretical limit with 15 ppm/db or less is more preferable. A 50% or greater conversion of the maximum theoretical limit with 10 ppm/db or less is even more preferable. A 50% or more conversion of the maximum theoretical limit with 5 ppm/db or less is even more preferable. A 50% or greater conversion of the maximum theoretical limit with 3 ppm/db or less is even more preferable. A 50% or greater conversion of the maximum theoretical limit with 2 ppm/db or less is even more preferable.

In some preferred embodiments, a metathesis reaction may catalyze the metathesis of at least 70% of the maximum theoretical conversion limit with a catalyst loading of 30 ppm or less per mol of carbon-carbon double bonds in the feedstock ("ppm/db"). A 70% or greater conversion of the maximum theoretical limit with 15 ppm/db or less is more preferable. A 70% or greater conversion of the maximum theoretical limit with 10 ppm/db or less is even more preferable. A 70% or more conversion of the maximum theoretical limit with 5 ppm/db or less is even more preferable. A 70% or greater conversion of the maximum theoretical limit with 3 ppm/db or less is even more preferable. A 70% or greater conversion of the maximum theoretical limit with 2 ppm/db or less is even more preferable.

In some preferred embodiments, a metathesis reaction may catalyze the metathesis of at least 85% of the maximum theoretical conversion limit with a catalyst loading of 30 ppm or less per mol of carbon-carbon double bonds in the feedstock ("ppm/db"). An 85% or greater conversion of the maximum theoretical limit with 15 ppm/db or less is more preferable. An 85% or greater conversion of the maximum theoretical limit with 10 ppm/db or less is even more preferable. An 85% or more conversion of the maximum theoretical limit with 5 ppm/db or less is even more preferable. An 85% or greater conversion of the maximum theoretical limit with 3 ppm/db or less is even more preferable. An 85% or greater conversion of the maximum theoretical limit with 2 ppm/db or less is even more preferable.

In some preferred embodiments, at very low catalyst loadings of 1 ppm/db, a metathesis reaction may catalyze the metathesis of at least 30% conversion of the maximum theoretical limit. A 40% or greater conversion of the maximum theoretical limit with 1 ppm/db or less is even more preferable. A 50% or more conversion of the maximum theoretical limit with 1 ppm/db or less is even more preferable. A 60% or greater conversion of the maximum theoretical limit with 1 ppm/db or less is even more preferable.

Following the thermal treatment, the feedstock is cooled down before it is exposed to oxygen. This cooling step may help prevent unwanted generation of new peroxides that can poison the metathesis reaction. In general, the feedstock will be cooled below approximately 100° C. before it is exposed to oxygen. More preferably, the treated feedstock is cooled below approximately 80° C. Even more preferably, the treated feedstock is cooled below approximately 60° C. Even more preferably, the treated feedstock is cooled to below approximately 40° C. before it is exposed to oxygen.

After the heating, a metathesis catalyst may be added to the feedstock to initiate the metathesis reaction. Preferably, the metathesis catalyst is combined with the feedstock without exposure to air, as the metathesis catalyst is typically sensitive to air. Alternatively, the feedstock may be stored. If the feedstock is stored before it is used in a metathesis reaction, it is desirable to store the treated feedstock under an inert gas, such as nitrogen, until the feedstock is ready for use in a metathesis reaction.

As noted previously, the natural oil feedstocks typically have a starting peroxide value (PV) that ranges from approximately 1 milliequivalent per 1000 g feedstock (meq/kg) to more than 10 meq/kg. Thermal treatment preferably diminishes the peroxide value in the feedstock to less than 1 meq/kg. It is more preferable to reduce the peroxide value to less than 0.5 meq/kg. In circumstances where the feedstock has a starting peroxide value that is greater than 5 meq/kg, it is preferable to diminish the level of peroxides with thermal treatment by approximately 80% or more. It is more preferable to diminish the level of peroxides with thermal treatment by approximately 90% or more. In circumstances where the feedstock has a starting peroxide value that is greater than 10 meq/kg, it is preferable to diminish the level of peroxides with thermal treatment by approximately 90% or more. It is more preferable to diminish the level of peroxides with thermal treatment by approximately 95% or more.

In some embodiments, in addition to a thermal treatment, it may also be desirable to use physical means to diminish the level of poisons in the feedstock. An adsorbent may be added to the feedstock to assist in diminishing the level of catalyst poisons. The adsorbent may be added before, during, or after any of the thermal treatment conditions previously described. Preferably, the adsorbent is added during or after the thermal treatment. More preferably, the adsorbent is added after the thermal treatment. Even more preferably, the adsorbent is added after the temperature of the feedstock has been cooled down below approximately 100° C., in part to limit the amount of air that may enter the mixture during the addition. Even more preferably, the adsorbent is added after the temperature has cooled down below approximately 80° C. Even more preferably, the adsorbent is added after the temperature has cooled down below approximately 60° C. Even more preferably, the adsorbent is added after the temperature of the feedstock has been cooled down below approximately 40° C. Should air enter the mixture during the addition of the adsorbent, a vacuum may be pulled or the mixture may be sparged with an inert gas such as nitrogen.

Preferably, the amount of adsorbent added to the feedstock may range from about 0.1 wt % to about 5 wt % when used in conjunction with the thermal treatment. More preferably, the amount of adsorbent added to the feedstock may range from about 0.1 wt % to about 3 wt %. Even more preferably, the level of adsorbent ranges from about 0.2 wt % to about 2 wt %.

After the adsorbent is added, it is mixed with the feedstock for sufficient time for the adsorbent to diminish residual peroxides and other non-peroxide poisons, such as "color bodies." Additional hold time and mixing is provided for the adsorbent. The necessary hold time will depend on the temperature and mixing intensity. High-intensity mixing may be employed. Typically, the sufficient time for the adsorption treatment step is a matter of hours. More preferably, the adsorption treatment is less than an hour. Even more preferably, the time sufficient for the adsorption treatment is a matter of minutes.

Examples of adsorbents that may be used in combination with a thermal treatment include, but are not limited to, molecular sieves, activated carbon, zeolites, silica gel, Fuller's earth, neutral alumina, basic Alumina, Celite, acid-activated clay, aluminum sulfate, calcium carbonate, Kaolin, magnesium sulfate, potassium chloride, potassium magnesium sulfate, potassium sulfate, soda ash, sodium carbonate, sodium sulfate, magnesium silicate, etc.

In preferred embodiments, the adsorbent is a silicate such as magnesium silicate (e.g., MAGNESOL from The Dallas Group of America, Inc.) may be used as the adsorbent. Preferably, the level of magnesium silicate adsorbent ranges from about 0.1 wt % to about 5 wt % when used in conjunction with the thermal treatment. More preferably, the amount of magnesium silicate ranges from about 0.1 wt % to about 3 wt %. Even more preferably, the level of magnesium silicate ranges from about 0.2 wt % to about 2 wt %. Additional hold time and mixing may be provided for the magnesium silicate. Again, the necessary hold time will depend on the temperature and mixing intensity. High intensity mixing may be employed. Typically, the sufficient time for the adsorption treatment step with magnesium silicate is a matter of hours. More preferably, the adsorption treatment with magnesium silicate is less than an hour. Even more preferably, the time sufficient for the adsorption treatment with magnesium silicate is a matter of minutes. The magnesium silicate may be added before, during, or after any of the thermal treatment conditions previously described. Preferably, the magnesium silicate is added during or after the thermal treatment. More preferably, the magnesium silicate is added after the thermal treatment.

The adsorbent may be removed by filtration, centrifugation, or any other method of solid-liquid separation known to those skilled in the art. Optionally, a filter aid, such as Celite, can also be added at the time of adsorbent addition to aid subsequent filtration. The treated feedstock is typically cooled to less than about 40° C. before allowing exposure to air. Thermal plus adsorbent treatment preferably diminishes the peroxide value in the feedstock to less than 1 meq/kg. It is more preferable to reduce the peroxide value to less than 0.5 meq/kg. In circumstances where the feedstock has a starting peroxide value that is greater than 5 meq/kg, it is preferable to diminish the level of peroxides with thermal treatment by approximately 80% or more. It is more preferable to diminish the level of peroxides with thermal plus adsorbent treatment by approximately 90% or more. In circumstances where the feedstock has a starting peroxide value that is greater than 10 meq/kg, it is preferable to diminish the level of peroxides with thermal plus adsorbent treatment by approximately 90% or more. It is more preferable to diminish the level of peroxides with thermal plus adsorbent treatment by approximately 95% or more.

When the metathesis reaction is conducted, it is desired that a diminished level of catalyst poisons based upon the thermal plus adsorbent will result in an improved feedstock conversion at a lower catalyst loading. In some preferred embodiments, a metathesis reaction may catalyze the metathesis of at least 50% of the maximum theoretical conversion limit with a catalyst loading of 30 ppm or less per mol of carbon-carbon double bonds in the feedstock ("ppm/db"). A 50% or greater conversion of the maximum theoretical limit with 15 ppm/db or less is more preferable. A 50% or greater conversion of the maximum theoretical limit with 10 ppm/db or less is even more preferable. A 50% or more conversion of the maximum theoretical limit with 5 ppm/db or less is even more preferable. A 50% or greater conversion of the maximum theoretical limit with 3 ppm/db or less is even more preferable. A 50% or greater conversion of the maximum theoretical limit with 2 ppm/db or less is even more preferable.

In some preferred embodiments, a metathesis reaction may catalyze the metathesis of at least 70% of the maximum theoretical conversion limit with a catalyst loading of 30 ppm or less per mol of carbon-carbon double bonds in the feedstock ("ppm/db"). A 70% or greater conversion of the maximum theoretical limit with 15 ppm/db or less is more preferable. A 70% or greater conversion of the maximum theoretical limit with 10 ppm/db or less is even more preferable. A 70% or more conversion of the maximum theoretical limit with 5 ppm/db or less is even more preferable. A 70% or greater conversion of the maximum theoretical limit with 3 ppm/db or less is even more preferable. A 70% or greater conversion of the maximum theoretical limit with 2 ppm/db or less is even more preferable.

In some preferred embodiments, a metathesis reaction may catalyze the metathesis of at least 85% of the maximum theoretical conversion limit with a catalyst loading of 30 ppm or less per mol of carbon-carbon double bonds in the feedstock ("ppm/db"). An 85% or greater conversion of the maximum theoretical limit with 15 ppm/db or less is more preferable. An 85% or greater conversion of the maximum theoretical limit with 10 ppm/db or less is even more preferable. An 85% or more conversion of the maximum theoretical limit with 5 ppm/db or less is even more preferable. An 85% or greater conversion of the maximum theoretical limit with 3 ppm/db or less is even more preferable. An 85% or greater conversion of the maximum theoretical limit with 2 ppm/db or less is even more preferable.

In some preferred embodiments, at very low catalyst loadings of 1 ppm/db, a metathesis reaction may catalyze the metathesis of at least 30% conversion of the maximum theoretical limit. A 40% or greater conversion of the maximum theoretical limit with 1 ppm/db or less is even more preferable. A 50% or more conversion of the maximum theoretical limit with 1 ppm/db or less is even more preferable. A 60% or greater conversion of the maximum theoretical limit with 1 ppm/db or less is even more preferable.

Tables 2, 4, and 5, shown and described below, display experimental results associated with thermal and adsorbent treatment. Additionally, other non-peroxide catalyst poisons are diminished to an unknown extent, based on experimental results in Tables 4 and 5, shown and described below.

Experimental data shows that (1) thermal and (2) thermal plus adsorbent treatments are improvements over adsorbent treatment alone. When adsorbents are used by themselves to diminish catalyst poisons, excessively high levels of adsorbents and/or excessively long contact times may be required to diminish catalyst poisons. The use of higher quantities of adsorbent adds an undesired cost to the process. Additionally, adsorbent treatment alone may fail to diminish the non-peroxide catalyst poisons. Using a thermal treatment possibly combined with an adsorbent can advantageously minimize the amount of adsorbent required and/or minimize the contact time required. Additionally, diminished levels of peroxides and other non-peroxide catalyst poisons may be achieved through thermal treatment that was not possible in adsorbent treatment alone. Furthermore, the combined thermal plus adsorbent treatment method may also boost the efficiency of certain adsorbents that when used alone would not be nearly as effective at maximizing catalyst efficiency.

After thermal or thermal plus adsorbent treatment, the treated feedstock is then preferably stored under nitrogen until ready for use in a metathesis reaction, such as self-metathesis, cross-metathesis, or ring-opening metathesis.

After the thermal or thermal plus adsorbent treatment, the feedstock may be subjected to a metathesis reaction in the presence of a metathesis catalyst.

The term "metathesis catalyst" includes any catalyst or catalyst system that catalyzes a metathesis reaction. Any known or future-developed metathesis catalyst may be used, alone or in combination with one or more additional catalysts. Exemplary metathesis catalysts include metal carbene catalysts based upon transition metals, for example, ruthenium, molybdenum, osmium, chromium, rhenium, and tungsten. The olefin metathesis catalyst for carrying out the cross-metathesis reactions of the disclosure is preferably a Group 8 transition metal complex having the structure of formula (III)

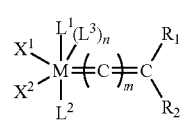

(III)

in which the various substituents are as follows:

M is a Group 8 transition metal;
$L^1$, $L^2$ and $L^3$ are neutral electron donor ligands;
n is 0 or 1, such that $L^3$ may or may not be present;
m is 0, 1, or 2;
$X^1$ and $X^2$ are anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups,
wherein any two or more of $X^1$, $X^2$, $L^1$, $L^2$, $L^3$, $R^1$, and $R^2$ can be taken together to form a cyclic group, and further wherein any one or more of $X^1$, $X^2$, $L^1$, $L^2$, $L^3$, $R^1$, and $R^2$ may be attached to a support.

Preferred catalysts contain Ru or Os as the Group 8 transition metal, with Ru particularly preferred.

Numerous embodiments of the catalysts useful in the reactions of the disclosure are described in more detail infra. For the sake of convenience, the catalysts are described in groups, but it should be emphasized that these groups are not meant to be limiting in any way. That is, any of the catalysts useful in the disclosure may fit the description of more than one of the groups described herein.

A first group of catalysts, then, are commonly referred to as $1^{st}$ Generation Grubbs-type catalysts, and have the structure of formula (III). For the first group of catalysts, M and m are as described above, and n, $X^1$, $X^2$, $L^2$, $L^3$, $R^1$, and $R^2$ are described as follows.

For the first group of catalysts, n is 0, and $L^1$ and $L^2$ are independently selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether. Exemplary ligands are trisubstituted phosphines.

$X^1$ and $X^2$ are anionic ligands, and may be the same or different, or are linked together to form a cyclic group, typically although not necessarily a five- to eight-membered ring. In preferred embodiments, $X^1$ and $X^2$ are each independently hydrogen, halide, or one of the following groups: $C_1$-$C_{20}$ alkyl, $C_5$-$C_{24}$ aryl, $C_1$-$C_{20}$ alkoxy, $C_5$-$C_{24}$ aryloxy, $C_2$-$C_{20}$ alkoxycarbonyl, $C_6$-$C_{24}$ aryloxycarbonyl, $C_2$-$C_{24}$ acyl, $C_2$-$C_{24}$ acyloxy, $C_1$-$C_{20}$ alkylsulfonato, $C_5$-$C_{24}$ arylsulfonato, $C_1$-$C_{20}$ alkylsulfanyl, $C_5$-$C_{24}$ arylsulfanyl, $C_1$-$C_{20}$ alkylsulfinyl, or $C_5$-$C_{24}$ arylsulfinyl. Optionally, $X^1$ and $X^2$ may be substituted with one or more moieties selected from $C_1$-$C_{12}$ alkyl, $C_1$-$C_{12}$ alkoxy, $C_5$-$C_{24}$ aryl, and halide, which may, in turn, with the exception of halide, be further substituted with one or more groups selected from halide, $C_1$-$C_6$ alkyl, $C_1$-$C_6$ alkoxy, and phenyl. In more preferred embodiments, $X^1$ and $X^2$ are halide, benzoate, $C_2$-$C_6$ acyl, $C_2$-$C_6$ alkoxycarbonyl, $C_1$-$C_6$ alkyl, phenoxy, $C_1$-$C_6$ alkoxy, $C_1$-$C_6$ alkylsulfanyl, aryl, or $C_1$-$C_6$ alkylsulfonyl. In even more preferred embodiments, $X^1$ and $X^2$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethane-sulfonate. In the most preferred embodiments, $X^1$ and $X^2$ are each chloride.

R¹ and R² are independently selected from hydrogen, hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), heteroatom-containing hydrocarbyl (e.g., heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and substituted heteroatom-containing hydrocarbyl (e.g., substituted heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and functional groups. R¹ and R² may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In preferred catalysts, R¹ is hydrogen and R² is selected from $C_1$-$C_{20}$ alkyl, $C_2$-$C_{20}$ alkenyl, and $C_5$-$C_{24}$ aryl, more preferably $C_1$-$C_6$ alkyl, $C_2$-$C_6$ alkenyl, and $C_5$-$C_{14}$ aryl. Still more preferably, R² is phenyl, vinyl, methyl, isopropyl, or t-butyl, optionally substituted with one or more moieties selected from $C_1$-$C_6$ alkyl, $C_1$-$C_6$ alkoxy, phenyl, and a functional group Fn as defined earlier herein. Most preferably, R² is phenyl or vinyl substituted with one or more moieties selected from methyl, ethyl, chloro, bromo, iodo, fluoro, nitro, dimethylamino, methyl, methoxy, and phenyl. Optimally, R² is phenyl or —C=C(CH₃)₂.

Any two or more (typically two, three, or four) of X¹, X², L¹, L², L³, R¹, and R² can be taken together to form a cyclic group, as disclosed, for example, in U.S. Pat. No. 5,312,940 to Grubbs et al. When any of X¹, X², L¹, L², L³, R¹, and R² are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of catalysts, commonly referred to as 2$^{nd}$ Generation Grubbs-type catalysts, have the structure of formula (III), wherein L¹ is a carbene ligand having the structure of formula (IV)

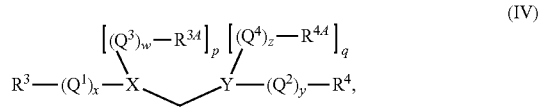

such that the complex may have the structure of formula (V)

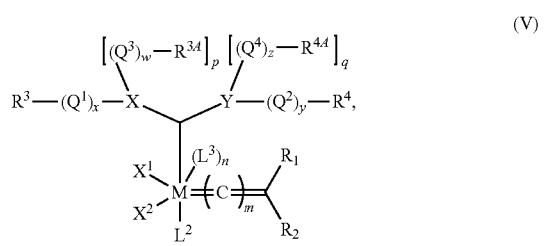

wherein M, m, n, X¹, X², L², L³, R¹, and R² are as defined for the first group of catalysts, and the remaining substituents are as follows.

X and Y are heteroatoms typically selected from N, O, S, and P. Since O and S are divalent, p is necessarily zero when X is O or S, and q is necessarily zero when Y is O or S. However, when X is N or P, then p is 1, and when Y is N or P, then q is 1. In a preferred embodiment, both X and Y are N.

Q¹, Q², Q³, and Q⁴ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within Q¹, Q², Q³, and Q⁴ may be linked to form an additional cyclic group.

R³, R³ᴬ, R⁴, and R⁴ᴬ are independently selected from hydrogen, hydrocarbyl, substituted hydrocarbyl, heteroatom-containing hydrocarbyl, and substituted heteroatom-containing hydrocarbyl.

In addition, any two or more of X¹, X², L¹, L², L³, R¹, R², R³, R³ᴬ, R⁴, and R⁴ᴬ can be taken together to form a cyclic group, and any one or more of X¹, X², L¹, L², L³, R¹, R², R³, R³ᴬ, R⁴, and R⁴ᴬ may be attached to a support.

Preferably, R³ᴬ and R⁴ᴬ are linked to form a cyclic group so that the carbene ligand is an heterocyclic carbene and preferably an N-heterocyclic carbene, such as the N-heterocylic carbene having the structure of formula (VI)

where R³ and R⁴ are defined above, with preferably at least one of R³ and R⁴, and more preferably both R³ and R⁴, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to about five cyclic groups. Q is often, although again not necessarily, a two-atom linkage or a three-atom linkage.

Examples of N-heterocyclic carbene ligands suitable as L¹ thus include, but are not limited to, the following:

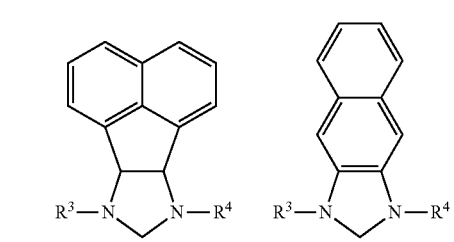

-continued

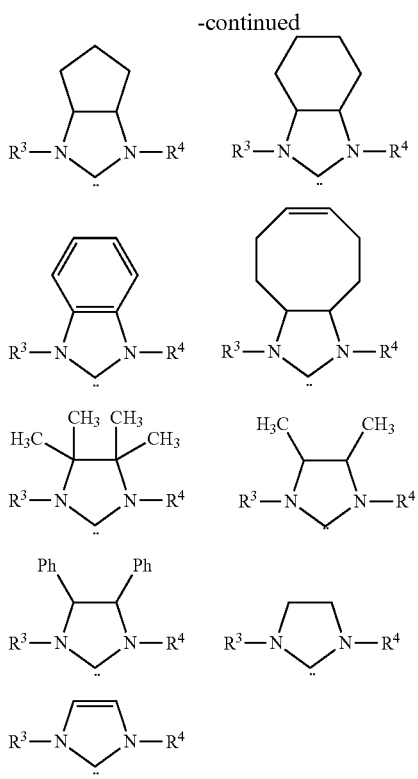

When M is ruthenium, then, the preferred complexes have the structure of formula (VII).

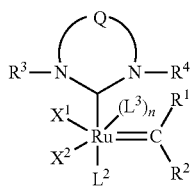

(VII)

In a more preferred embodiment, Q is a two-atom linkage having the structure $-CR^{11}R^{12}-CR^{13}R^{14}-$ or $-CR^{11}=CR^{13}-$, preferably $-CR^{11}R^{12}-CR^{13}R^{14}-$, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups. Examples of functional groups here include carboxyl, $C_1$-$C_{20}$ alkoxy, $C_5$-$C_{24}$ aryloxy, $C_2$-$C_{20}$ alkoxycarbonyl, $C_5$-$C_{24}$ alkoxycarbonyl, $C_2$-$C_{24}$ acyloxy, $C_1$-$C_{20}$ alkylthio, $C_5$-$C_{24}$ arylthio, $C_1$-$C_{20}$ alkylsulfonyl, and $C_1$-$C_{20}$ alkylsulfinyl, optionally substituted with one or more moieties selected from $C_1$-$C_{12}$ alkyl, $C_1$-$C_{12}$ alkoxy, $C_5$-$C_{14}$ aryl, hydroxyl, sulfhydryl, formyl, and halide. $R^{11}$, $R^{12}$, $R^{13}$, and $R^{14}$ are preferably independently selected from hydrogen, $C_1$-$C_{12}$ alkyl, substituted $C_1$-$C_{12}$ alkyl, $C_1$-$C_{12}$ heteroalkyl, substituted $C_1$-$C_{12}$ heteroalkyl, phenyl, and substituted phenyl. Alternatively, any two of $R^{11}$, $R^{12}$, $R^{13}$, and $R^{14}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents.

When $R^3$ and $R^4$ are aromatic, they are typically although not necessarily composed of one or two aromatic rings, which may or may not be substituted, e.g., $R^3$ and $R^4$ may be phenyl, substituted phenyl, biphenyl, substituted biphenyl, or the like. In one preferred embodiment, $R^3$ and $R^4$ are the same and are each unsubstituted phenyl or phenyl substituted with up to three substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Preferably, any substituents present are hydrogen, $C_1$-$C_{12}$ alkyl, $C_1$-$C_{12}$ alkoxy, $C_5$-$C_{14}$ aryl, substituted $C_5$-$C_{14}$ aryl, or halide. As an example, $R^3$ and $R^4$ are mesityl.

In a third group of catalysts having the structure of formula (III), M, m, n, $X^1$, $X^2$, $R^1$, and $R^2$ are as defined for the first group of catalysts, $L^1$ is a strongly coordinating neutral electron donor ligand such as any of those described for the first and second groups of catalysts, and $L^2$ and $L^3$ are weakly coordinating neutral electron donor ligands in the form of optionally substituted heterocyclic groups. Again, n is zero or 1, such that $L^3$ may or may not be present. Generally, in the third group of catalysts, $L^2$ and $L^3$ are optionally substituted five- or six-membered monocyclic groups containing 1 to 4, preferably 1 to 3, most preferably 1 to 2 heteroatoms, or are optionally substituted bicyclic or polycyclic structures composed of 2 to 5 such five- or six-membered monocyclic groups. If the heterocyclic group is substituted, it should not be substituted on a coordinating heteroatom, and any one cyclic moiety within a heterocyclic group will generally not be substituted with more than 3 substituents.

For the third group of catalysts, examples of $L^2$ and $L^3$ include, without limitation, heterocycles containing nitrogen, sulfur, oxygen, or a mixture thereof.

Examples of nitrogen-containing heterocycles appropriate for $L^2$ and $L^3$ include pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole.

Examples of sulfur-containing heterocycles appropriate for $L^2$ and $L^3$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene.

Examples of oxygen-containing heterocycles appropriate for $L^2$ and $L^3$ include 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran.

Examples of mixed heterocycles appropriate for $L^2$ and $L^3$ include isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred $L^2$ and $L^3$ ligands are aromatic nitrogen-containing and oxygen-containing heterocycles, and particularly preferred $L^2$ and $L^3$ ligands are monocyclic N-heteroaryl ligands that are optionally substituted with 1 to 3, preferably 1 or 2, substituents. Specific examples of particularly preferred $L^2$ and $L^3$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on $L^2$ and/or $L^3$ are selected from halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, with suitable functional groups including, without limitation, $C_1$-$C_{20}$ alkoxy, $C_5$-$C_{24}$ aryloxy, $C_2$-$C_{20}$ alkylcarbonyl, $C_6$-$C_{24}$ arylcarbonyl, $C_2$-$C_{20}$ alkylcarbonyloxy, $C_6$-$C_{24}$ arylcarbonyloxy, $C_2$-$C_{20}$ alkoxycarbonyl, $C_6$-$C_{24}$ aryloxycarbonyl, halocarbonyl, $C_2$-$C_{20}$ alkylcarbonato, $C_6$-$C_{24}$ arylcarbonato, carboxy, carboxylato, carbamoyl, mono-($C_1$-$C_{20}$ alkyl)-substituted carbamoyl, di-($C_1$-$C_{20}$ alkyl)-substituted carbamoyl, di-N—($C_1$-$C_{20}$ alkyl), N—($C_5$-$C_{24}$ aryl)-substituted carbamoyl, mono-($C_5$-$C_{24}$ aryl)-substituted carbamoyl, di-($C_6$-$C_{24}$ aryl)-substituted carbamoyl, thiocarbamoyl, mono-($C_1$-$C_{20}$ alkyl)-substituted thiocarbamoyl, di-($C_1$-$C_{20}$ alkyl)-substituted thiocarbamoyl, di-N—($C_1$-$C_{20}$ alkyl)-N—($C_6$-$C_{24}$ aryl)-substituted thiocarbamoyl, mono-($C_6$-$C_{24}$ aryl)-substituted thiocarbamoyl, di-($C_6$-$C_{24}$ aryl)-substituted thiocarbamoyl, carbamido, formyl, thioformyl, amino, mono-($C_1$-$C_{20}$ alkyl)-substituted amino, di-($C_1$-$C_{20}$ alkyl)-substituted amino, mono-($C_5$-$C_{24}$ aryl)-substituted amino, di-($C_5$-$C_{24}$ aryl)-substituted amino, di-N—($C_1$-$C_{20}$ alkyl), N—($C_5$-$C_{24}$ aryl)-substituted amino, $C_2$-$C_{20}$ alkylamido, $C_6$-$C_{24}$ arylamido, imino, $C_1$-$C_{20}$ alkylimino, $C_5$-$C_{24}$ arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on $L^2$ and $L^3$ include, without limitation, halo, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted $C_6$-$C_{16}$ alkaryl, $C_6$-$C_{16}$ heteroalkaryl, substituted $C_6$-$C_{16}$ heteroalkaryl, $C_6$-$C_{16}$ aralkyl, substituted $C_6$-$C_{16}$ aralkyl, $C_6$-$C_{16}$ heteroaralkyl, substituted $C_6$-$C_{16}$ heteroaralkyl, $C_1$-$C_{12}$ alkoxy, $C_5$-$C_{14}$ aryloxy, $C_2$-$C_{12}$ alkylcarbonyl, $C_6$-$C_{14}$ arylcarbonyl, $C_2$-$C_{12}$ alkylcarbonyloxy, $C_6$-$C_{14}$ arylcarbonyloxy, $C_2$-$C_{12}$ alkoxycarbonyl, $C_6$-$C_{14}$ aryloxycarbonyl, halocarbonyl, formyl, amino, mono-($C_1$-$C_{12}$ alkyl)-substituted amino, di-($C_1$-$C_{12}$ alkyl)-substituted amino, mono-($C_5$-$C_{14}$ aryl)-substituted amino, di-($C_5$-$C_{14}$ aryl)-substituted amino, and nitro.

Of the foregoing, the most preferred substituents are halo, $C_1$-$C_6$ alkyl, $C_1$-$C_6$ haloalkyl, $C_1$-$C_6$ alkoxy, phenyl, substituted phenyl, formyl, N,N-di$C_1$-$C_6$ alkyl)amino, nitro, and nitrogen heterocycles as described above (including, for example, pyrrolidine, piperidine, piperazine, pyrazine, pyrimidine, pyridine, pyridazine, etc.).

$L^2$ and $L^3$ may also be taken together to form a bidentate or multidentate ligand containing two or more, generally two, coordinating heteroatoms such as N, O, S, or P, with preferred such ligands being diimine ligands of the Brookhart type. One representative bidentate ligand has the structure of formula (VIII)

wherein $R^{15}$, $R^{16}$, $R^{17}$, and $R^{18}$ hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), heteroatom-containing hydrocarbyl (e.g., $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or substituted heteroatom-containing hydrocarbyl (e.g., substituted $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or (1) $R^{15}$ and $R^{16}$, (2) $R^{17}$ and $R^{18}$, (3) $R^{16}$ and $R^{17}$, or (4) both $R^{15}$ and $R^{16}$, and $R^{17}$ and $R^{18}$, may be taken together to form a ring, i.e., an N-heterocycle. Preferred cyclic groups in such a case are five- and six-membered rings, typically aromatic rings.

In a fourth group of catalysts that have the structure of formula (III), two of the substituents are taken together to form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$-, —As (Ph)$_2$CH$_2$CH$_2$As(Ph$_2$)-, —P(Ph)$_2$CH$_2$CH$_2$C(CF$_3$)$_2$O—, binaphtholate dianions, pinacolate dianions, —P(CH$_3$)$_2$(CH$_2$)$_2$P(CH$_3$)$_2$—, and —OC(CH$_3$)$_2$(CH$_3$)$_2$CO—. Preferred bidentate ligands are —P(Ph)$_2$CH$_2$CH$_2$P(Ph)$_2$- and —P(CH$_3$)$_2$(CH$_2$)$_2$P(CH$_3$)$_2$—. Tridentate ligands include, but are not limited to, (CH$_3$)$_2$NCH$_2$CH$_2$P(Ph)CH$_2$CH$_2$N(CH$_3$)$_2$. Other preferred tridentate ligands are those in which any three of $X^1$, $X^2$, $L^1$, $L^2$, $L^3$, $R^1$, and $R^2$ (e.g., $X^1$, $L^1$, and $L^2$) are taken together to be cyclopentadienyl, indenyl, or fluorenyl, each optionally substituted with $C_2$-$C_{20}$ alkenyl, $C_2$-$C_{20}$ alkynyl, $C_1$-$C_{20}$ alkyl, $C_5$-$C_{20}$ aryl, $C_1$-$C_{20}$ alkoxy, $C_2$-$C_{20}$ alkenyloxy, $C_2$-$C_{20}$ alkynyloxy, $C_5$-$C_{20}$ aryloxy, $C_2$-$C_{20}$ alkoxycarbonyl, alkylthio, $C_1$-$C_{20}$ alkylsulfonyl, or $C_1$-$C_{20}$ alkylsulfinyl, each of which may be further substituted with $C_1$-$C_6$ alkyl, halide, $C_1$-$C_6$ alkoxy or with a phenyl group optionally substituted with halide, $C_1$-$C_6$ alkyl, or $C_1$-$C_6$ alkoxy. More preferably, in compounds of this type, X, $L^1$, and $L^2$ are taken together to be cyclopentadienyl or indenyl, each optionally substituted with vinyl, $C_1$-$C_{10}$ alkyl, $C_5$-$C_{20}$ aryl, $C_1$-$C_{10}$ carboxylate, $C_2$-$C_{10}$ alkoxycarbonyl, $C_1$-$C_{10}$ alkoxy, or $C_5$-$C_{20}$ aryloxy, each optionally substituted with $C_1$-$C_6$ alkyl, halide, $C_1$-$C_6$ alkoxy or with a phenyl group optionally substituted with halide, $C_1$-$C_6$ alkyl or $C_1$-$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to O$_2$C(CH$_2$)$_2$P(Ph)(CH$_2$)$_2$P(Ph)(CH$_2$)$_2$CO$_2$, phthalocyanines, and porphyrins.

Complexes wherein $L^2$ and $R^2$ are linked are examples of the fourth group of catalysts, and are commonly called "Grubbs-Hoveyda" catalysts. Examples of Grubbs-Hoveyda-type catalysts include the following:

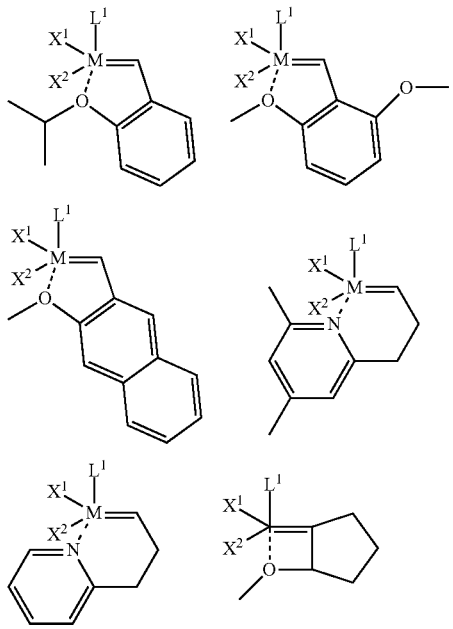

wherein $L^1$, $X^1$, $X^2$, and M are as described for any of the other groups of catalysts.

In addition to the catalysts that have the structure of formula (III), as described above, other transition metal carbene complexes include, but are not limited to:

neutral ruthenium or osmium metal carbene complexes containing metal centers that are formally in the +2 oxidation state, have an electron count of 16, are penta-coordinated, and are of the general formula (IX);

neutral ruthenium or osmium metal carbene complexes containing metal centers that are formally in the +2 oxidation state, have an electron count of 18, are hexa-coordinated, and are of the general formula (X);

cationic ruthenium or osmium metal carbene complexes containing metal centers that are formally in the +2 oxidation state, have an electron count of 14, are tetra-coordinated, and are of the general formula (XI); and cationic ruthenium or osmium metal carbene complexes containing metal centers that are formally in the +2 oxidation state, have an electron count of 14, are tetra-coordinated, and are of the general formula (XII)

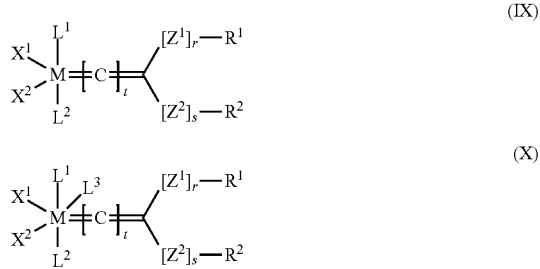

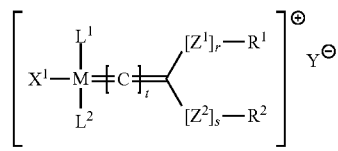

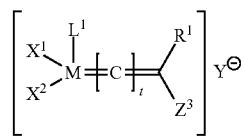

wherein: $X^1$, $X^2$, $L^1$, $L^2$, n, $L^3$, $R^1$, and $R^2$ are as defined for any of the previously defined four groups of catalysts; r and s are independently zero or 1; t is an integer in the range of zero to 5;

Y is any non-coordinating anion (e.g., a halide ion, $BF_4^-$, etc.); $Z^1$ and $Z^2$ are independently selected from —O—, —S—, —$NR^2$—, —$PR^2$—, —P(=O)$R^2$—, —P(O$R^2$)—, —P(=O)(O$R^2$)—, —C(=O)—, —C(=O)O—, —OC(=O)—, —OC(=O)O—, —S(=O)—, and —S(=O)$_2$—; $Z^3$ is any cationic moiety such as —P($R^2$)$_3^+$ or —N($R^2$)$_3^+$; and any two or more of $X^1$, $X^2$, $L^1$, $L^2$, $L^3$, n, $Z^1$, $Z^2$, $Z^3$, $R^1$, and $R^2$ may be taken together to form a cyclic group, e.g., a multidentate ligand, and wherein any one or more of $X^1$, $X^2$, $L^1$, $L^2$, n, $L^3$, $Z^1$, $Z^2$, $Z^3$, $R^1$, and $R^2$ may be attached to a support.

Other suitable complexes include Group 8 transition metal carbenes bearing a cationic substituent, such as are disclosed in U.S. Pat. No. 7,365,140 (Piers et al.) having the general structure (XIII):

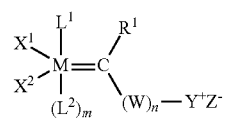

wherein:
M is a Group 8 transition metal;
$L^1$ and $L^2$ are neutral electron donor ligands;
$X^1$ and $X^2$ are anionic ligands;
$R^1$ is hydrogen, $C_1$-$C_{12}$ hydrocarbyl, or substituted $C_1$-$C_{12}$ hydrocarbyl;
W is an optionally substituted and/or heteroatom-containing $C_1$-$C_{20}$ hydrocarbylene linkage;
Y is a positively charged Group 15 or Group 16 element substituted with hydrogen, $C_1$-$C_{12}$ hydrocarbyl, substituted $C_1$-$C_{12}$ hydrocarbyl; heteroatom-containing $C_1$-$C_{12}$ hydrocarbyl, or substituted heteroatom-containing hydrocarbyl;
$Z^-$ is a negatively charged counterion;
m is zero or 1; and
n is zero or 1;
wherein any two or more of $L^1$, $L^2$, $X^1$, $X^2$, $R^1$, W, and Y can be taken together to form a cyclic group.

Each of M, $L^1$, $L^2$, $X^1$, and $X^2$ in structure (XIII) may be as previously defined herein.

W is an optionally substituted and/or heteroatom-containing $C_1$-$C_{20}$ hydrocarbylene linkage, typically an optionally substituted $C_1$-$C_{12}$ alkylene linkage, e.g., —(CH$_2$)$_i$— where i is an integer in the range of 1 to 12 inclusive and any of the hydrogen atoms may be replaced with a non-hydrogen substituent as described earlier herein with regard to the definition of the term "substituted." The subscript n is zero or 1, meaning that W may or may not be present. In a preferred embodiment, n is zero.

Y is a positively charged Group 15 or Group 16 element substituted with hydrogen, $C_1$-$C_{12}$ hydrocarbyl, substituted $C_1$-$C_{12}$ hydrocarbyl, heteroatom-containing $C_1$-$C_{12}$ hydrocarbyl, or substituted heteroatom-containing hydrocarbyl. Preferably, Y is a $C_1$-$C_{12}$ hydrocarbyl-substituted, positively charged Group 15 or Group 16 element. Representative Y groups include $P(R^2)_3$, $P(R^2)_3$, $As(R^2)^3$, $S(R^2)_2$, $O(R^2)_2$, where the $R^2$ are independently selected from $C_1$-$C_{12}$ hydrocarbyl; within these, preferred Y groups are phosphines of the structure $P(R^2)_3$ wherein the $R^2$ are independently selected from $C_1$-$C_{12}$ alkyl and aryl, and thus include, for example, methyl, ethyl, n-propyl, isopropyl, n-butyl, isobutyl, t-butyl, cyclopentyl, cyclohexyl, and phenyl. Y can also be a heterocyclic group containing the positively charged Group 15 or Group 16 element. For instance, when the Group 15 or Group 16 element is nitrogen, Y may be an optionally substituted pyridinyl, pyrazinyl, or imidazolyl group.

$Z^-$ is a negatively charged counterion associated with the cationic complex, and may be virtually any anion, so long as the anion is inert with respect to the components of the complex and the reactants and reagents used in the metathesis reaction catalyzed. Preferred $r$ moieties are weakly coordinating anions, such as, for instance, $[B(C_6F_5)_4]^-$, $[BF_4]^-$, $[B(C_6H_6)_4]^-$, $[CF_3S(O)_3]^-$, $[PF_6]^-$, $[SbF_6]^-$, $[AlCl_4]^-$, $[FSO_3]^-$, $[CB_{11}H_6Cl_6]^-$, $[CB_{11}H_6Br_6]^-$, and $[SO_3F:SbF_5]^-$. Preferred anions suitable as $Z^-$ are of the formula $B(R^{15})_4^-$ where $R^{15}$ is fluoro, aryl, or perfluorinated aryl, typically fluoro or perfluorinated aryl. Most preferred anions suitable as $Z^-$ are $BF_4^-$ and $B(C_6F_5)^-$, optimally the latter.

It should be emphasized that any two or more of $X^1$, $X^2$, $L^1$, $L^2$, $R^1$, W, and Y can be taken together to form a cyclic group, as disclosed, for example, in U.S. Pat. No. 5,312,940 to Grubbs et al. When any of $X^1$, $X^2$, $L^1$, $L^2$, $R^1$, W, and Y are linked to form cyclic groups, those cyclic groups may be five- or six-membered rings, or may comprise two or three five- or six-membered rings, which may be either fused or linked. The cyclic groups may be aliphatic or aromatic, and may be heteroatom-containing and/or substituted, as explained in part (I) of this section.

One group of exemplary catalysts encompassed by the structure of formula (XIII) are those wherein m and n are zero, such that the complex has the structure of formula (XIV)

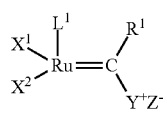

(XIV)

Possible and preferred $X^1$, $X^2$, and $L^1$ ligands are as described earlier with respect to complexes of formula (I), as are possible and preferred $Y^+$ and $Z^-$ moieties. M is Ru or Os, preferably Ru, and $R^1$ is hydrogen or $C_1$-$C_{12}$ alkyl, preferably hydrogen.

In formula (XIV)-type catalysts, $L^1$ is preferably a heteroatom-containing carbene ligand having the structure of formula (XV)

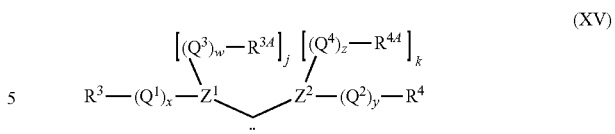

(XV)

such that complex (XIV) has the structure of formula (XVI)

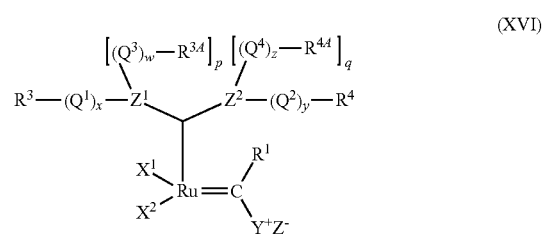

(XVI)

wherein $X^1$, $X^2$, $R^1$, $R^2$, Y, and Z are as defined previously, and the remaining substituents are as follows:

$Z^1$ and $Z^2$ are heteroatoms typically selected from N, O, S, and P. Since O and S are divalent, j is necessarily zero when $Z^1$ is O or S, and k is necessarily zero when $Z^2$ is O or S. However, when $Z^1$ is N or P, then j is 1, and when $Z^2$ is N or P, then k is 1. In a preferred embodiment, both $Z^1$ and $Z^2$ are N.

$Q^1$, $Q^2$, $Q^3$, and $Q^4$ are linkers, e.g., $C_1$-$C_{12}$ hydrocarbylene, substituted $C_1$-$C_{12}$ hydrocarbylene, heteroatom-containing $C_1$-$C_{12}$ hydrocarbylene, substituted heteroatom-containing $C_1$-$C_{12}$ hydrocarbylene, or —(CO)—, and w, x, y, and z are independently zero or 1, meaning that each linker is optional. Preferably, w, x, y, and z are all zero.

$R^3$, $R^{3A}$, $R^4$, and $R^{4A}$ are independently selected from hydrogen, hydrogen, $C_1$-$C_{20}$ hydrocarbyl, substituted $C_1$-$C_{20}$ hydrocarbyl, heteroatom-containing $C_1$-$C_{20}$ hydrocarbyl, and substituted heteroatom-containing $C_1$-$C_{20}$ hydrocarbyl.

Preferably, w, x, y, and z are zero, $Z^1$ and $Z^1$ are N, and $R^{3A}$ and $R^{4A}$ are linked to form -Q-, such that the complex has the structure of formula (XVII)

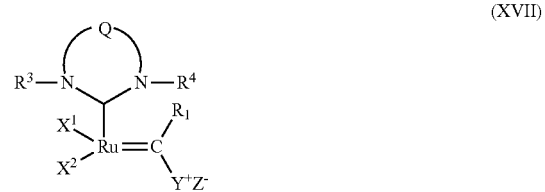

(XVII)

wherein $R^3$ and $R^4$ are defined above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including $C_1$-$C_{12}$ hydrocarbylene, substituted $C_1$-$C_{12}$ hydrocarbylene, heteroatom-containing $C_1$-$C_{12}$ hydrocarbylene, or substituted heteroatom-containing $C_1$-$C_{12}$ hydrocarbylene linker, wherein two or more substituents on adjacent atoms within Q may be linked to form an additional cyclic structure, which may be similarly substituted to provide a fused polycyclic structure of two to about five cyclic groups. Q is often, although not necessarily, a two-atom linkage or a three-atom linkage, e.g., —CH$_2$—CH$_2$—, —CH(Ph)—CH(Ph)— where Ph is phenyl;

=CR—N=, giving rise to an unsubstituted (when R=H) or substituted (R=other than H) triazolyl group; or —CH$_2$—SiR$_2$—CH$_2$— (where R is H, alkyl, alkoxy, etc.).

In a more preferred embodiment, Q is a two-atom linkage having the structure —CR$^8$R$^9$—CR$^{10}$R$^{11}$— or —CR$^8$=CR$^{10}$—, preferably —CR$^8$R$^9$—CR$^{10}$R$^{11}$—, wherein R$^8$, R$^9$, R$^{10}$, and R$^{11}$ are independently selected from hydrogen, C$_1$-C$_{12}$ hydrocarbyl, substituted C$_1$-C$_{12}$ hydrocarbyl, heteroatom-containing C$_1$-C$_{12}$ hydrocarbyl, substituted heteroatom-containing C$_1$-C$_{12}$ hydrocarbyl, and functional groups as defined in part (I) of this section. Examples of functional groups here include carboxyl, C$_1$-C$_{20}$ alkoxy, C$_5$-C$_{20}$ aryloxy, C$_2$-C$_{20}$ alkoxycarbonyl, C$_2$-C$_{20}$ alkoxycarbonyl, C$_2$-C$_{20}$ acyloxy, C$_1$-C$_{20}$ alkylthio, C$_5$-C$_{20}$ arylthio, C$_1$-C$_{20}$ alkylsulfonyl, and C$_1$-C$_{20}$ alkylsulfinyl, optionally substituted with one or more moieties selected from C$_1$-C$_{10}$ alkyl, C$_1$-C$_{10}$ alkoxy, C$_5$-C$_{20}$ aryl, hydroxyl, sulfhydryl, formyl, and halide. Alternatively, any two of R$^8$, R$^9$, R$^{10}$, and R$^{11}$ may be linked together to form a substituted or unsubstituted, saturated or unsaturated ring structure, e.g., a C$_4$-C$_{12}$ alicyclic group or a C$_5$ or C$_6$ aryl group, which may itself be substituted, e.g., with linked or fused alicyclic or aromatic groups, or with other substituents.

Further details concerning such formula (XIII) complexes, as well as associated preparation methods, may be obtained from U.S. Pat. No. 7,365,140, herein incorporated by reference.

As is understood in the field of catalysis, suitable solid supports for any of the catalysts described herein may be of synthetic, semi-synthetic, or naturally occurring materials, which may be organic or inorganic, e.g., polymeric, ceramic, or metallic. Attachment to the support will generally, although not necessarily, be covalent, and the covalent linkage may be direct or indirect, if indirect, typically through a functional group on a support surface.

Non-limiting examples of catalysts that may be used in the reactions of the disclosure include the following, some of which for convenience are identified throughout this disclosure by reference to their molecular weight:

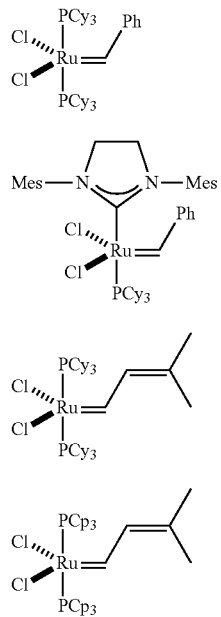

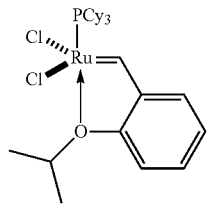

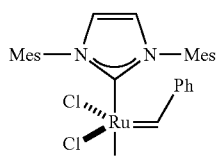

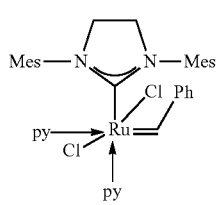

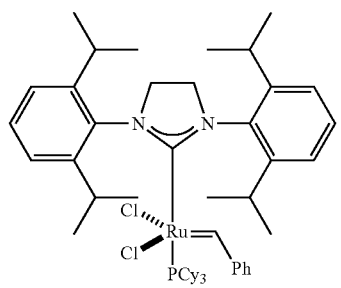

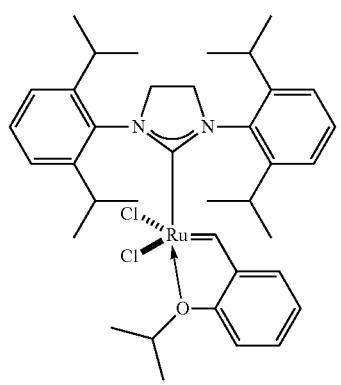

where
L = PCy$_3$, siMes, Mes, Phobane
X = H, NO$_2$, SO$_2$N(CH$_3$)$_2$
X$_2$ = H, N+(C$_2$H$_5$)$_2$CH$_3$
X$_3$ = H, Phenyl
R = H, alkyl, aryl, CO$_2$Me -continued
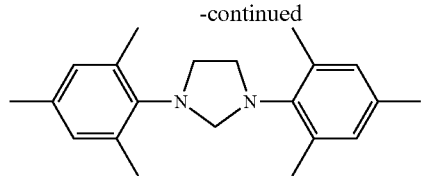
siMes
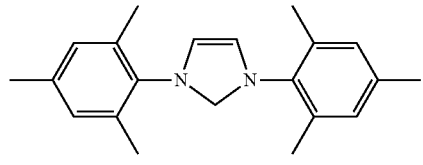
Mes
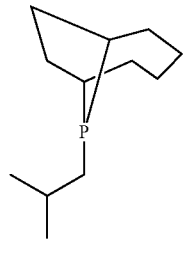
Phobane
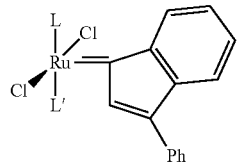
where
L = PCy₃, siMes, Mes, Phobane
L' = PCy₃, Phobane
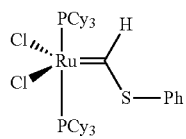
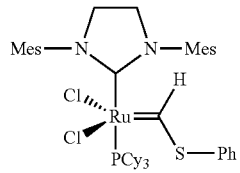
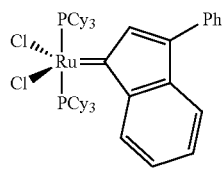
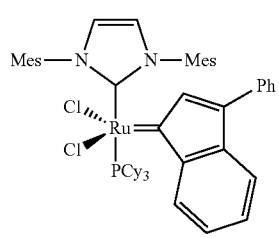
-continued
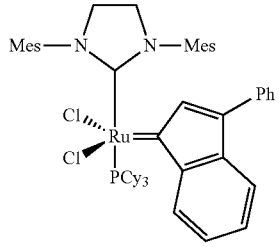
68
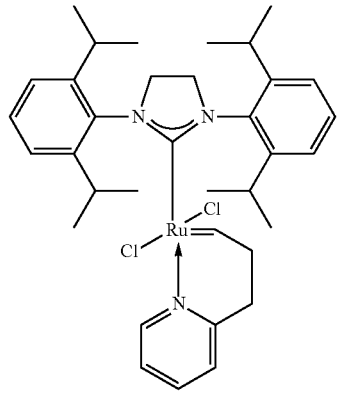
C682
52
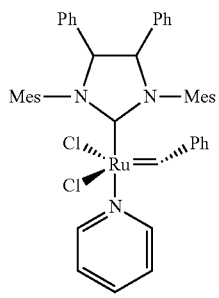
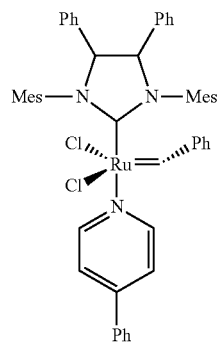
60
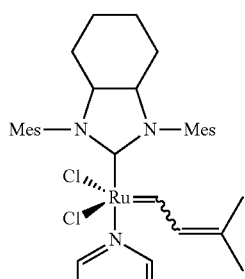
62
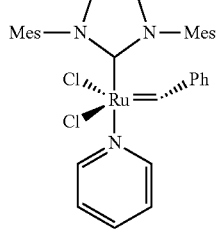
64
66
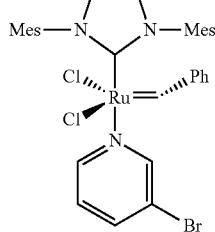
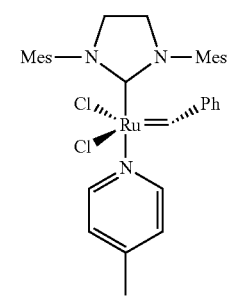

-continued
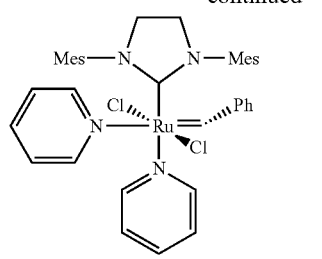
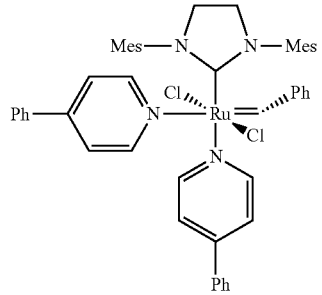
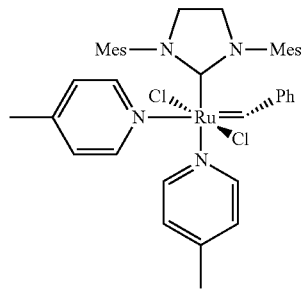
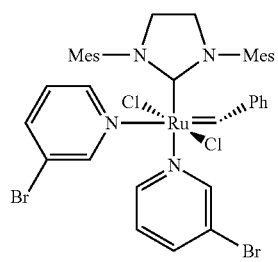
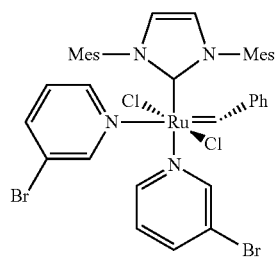
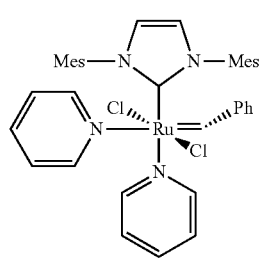
-continued
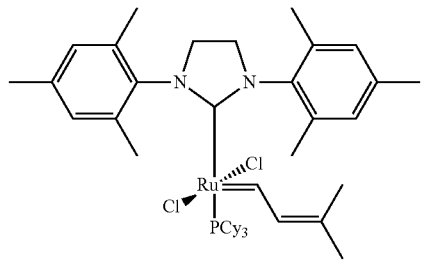
C827
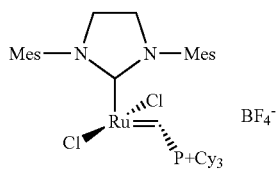
C859
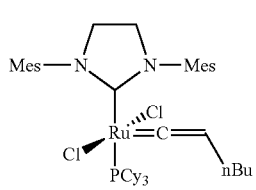
C841-n
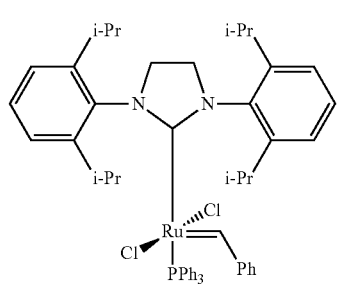
C916
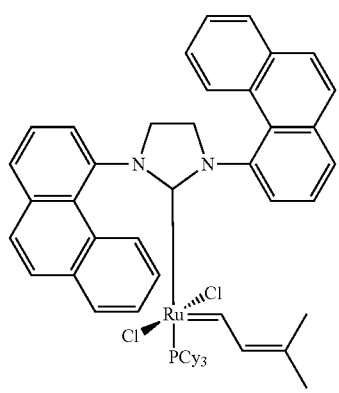
C965-p
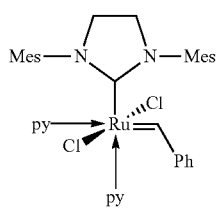
C727

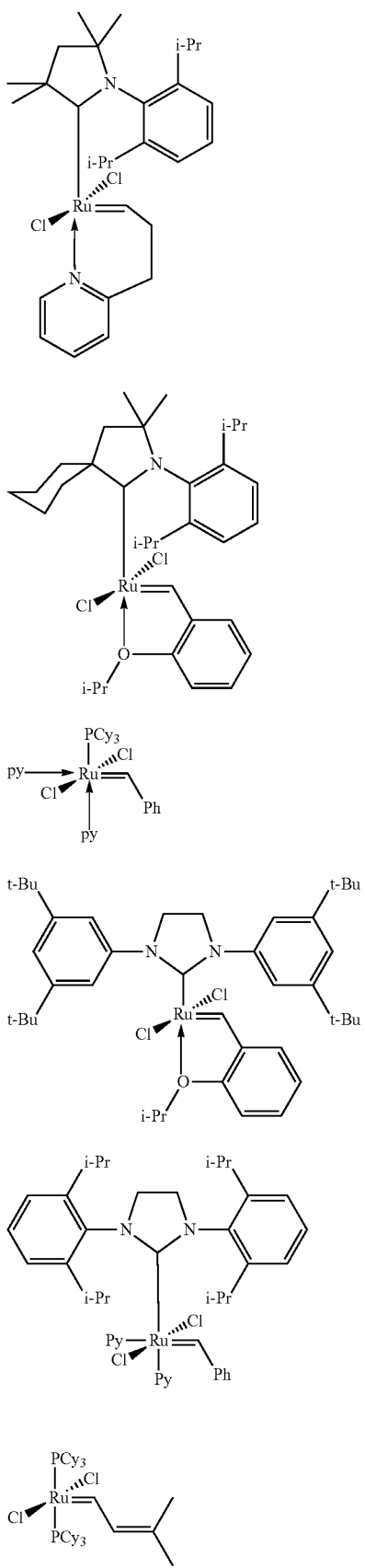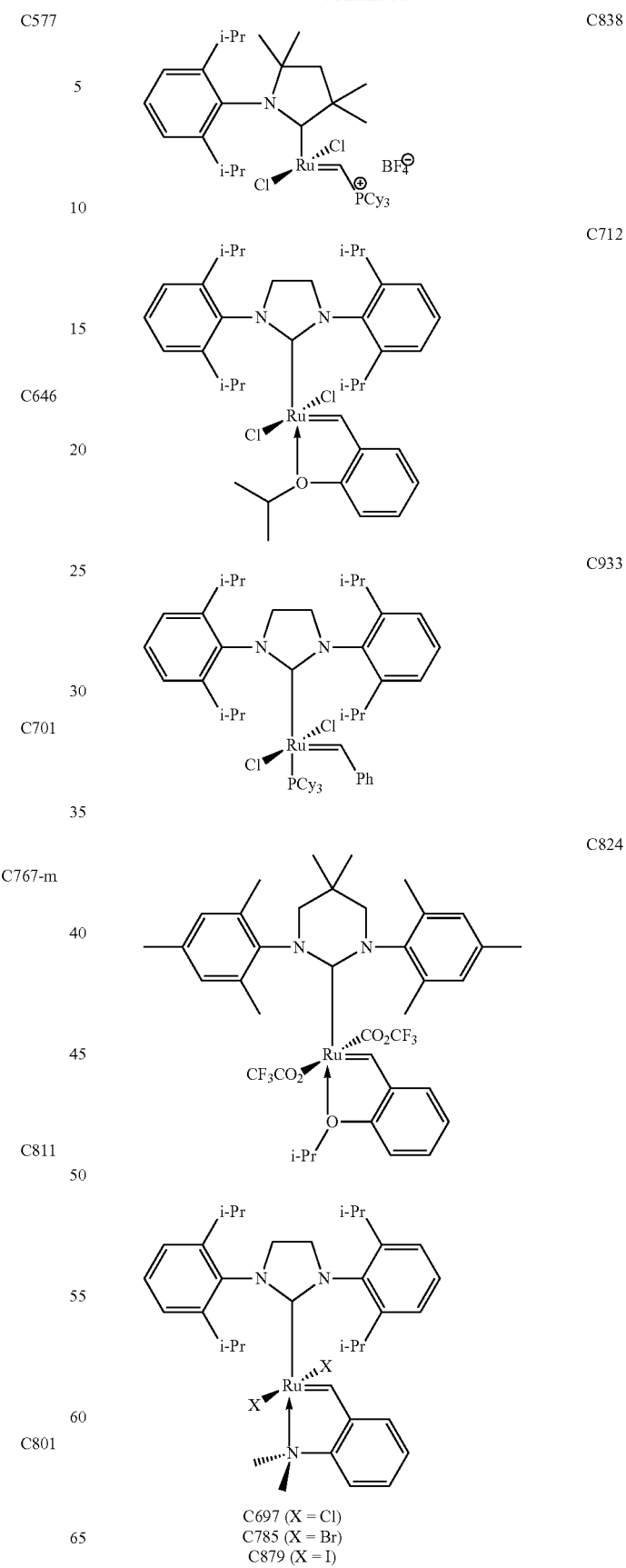

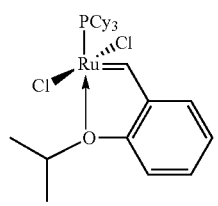
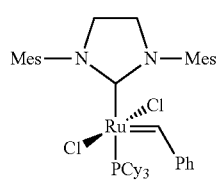
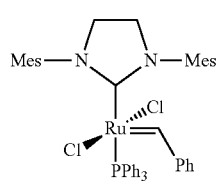
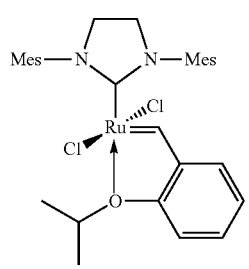
C672
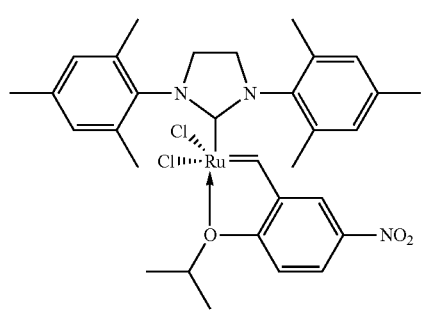
C657
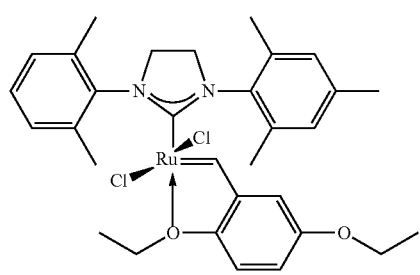
C601
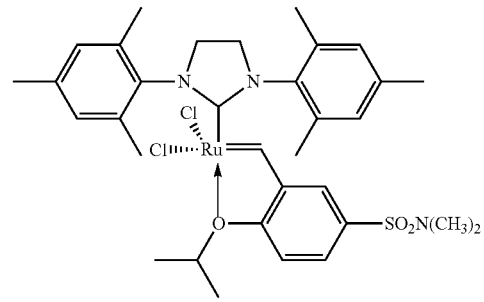
C848
C831
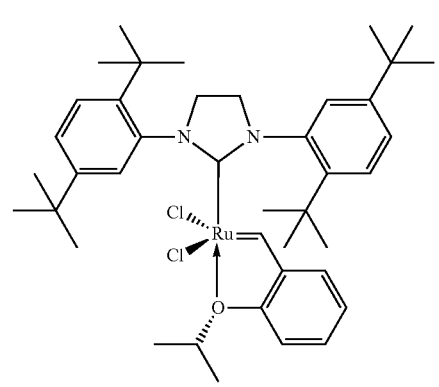
C627
C809
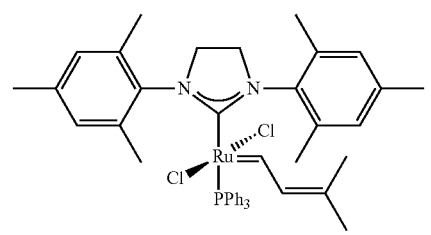
C849
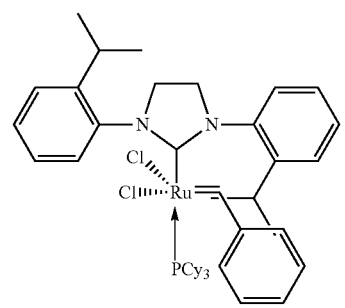
C923
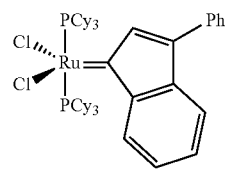

-continued

C-524

C-552

C-566

DPAI-278

-continued

C-598

C-626

C949

C823

C606

C629
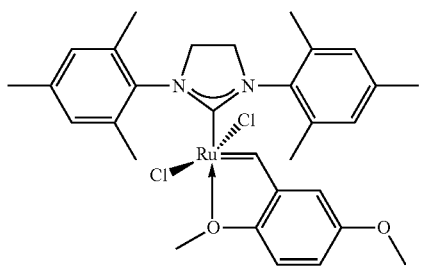
C833
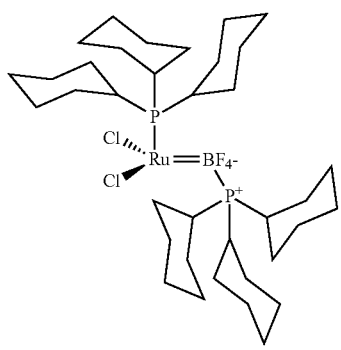
C613
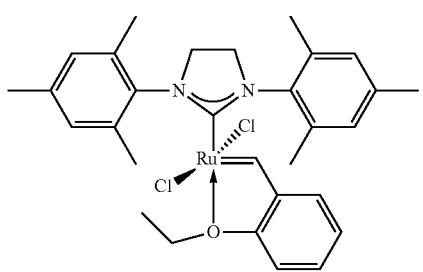
C827
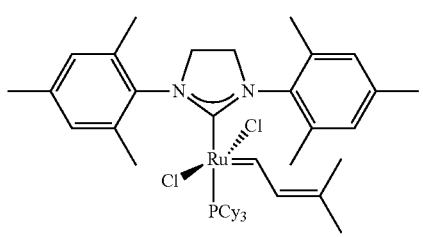
C627
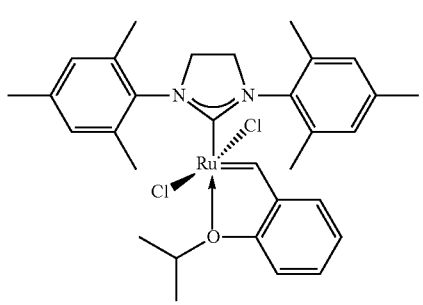
C793
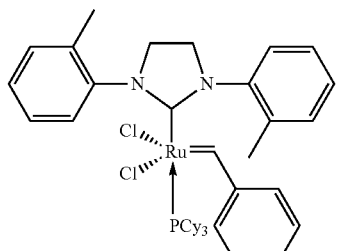
C598Cs
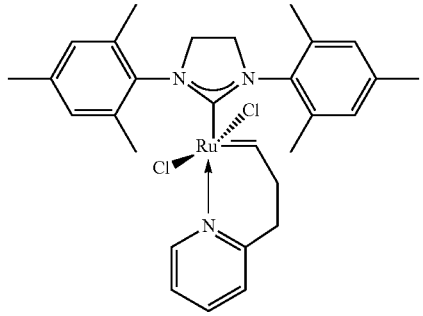
C782
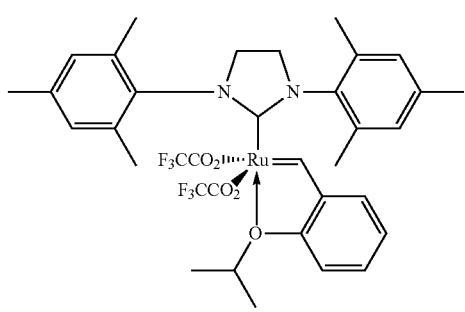
C702
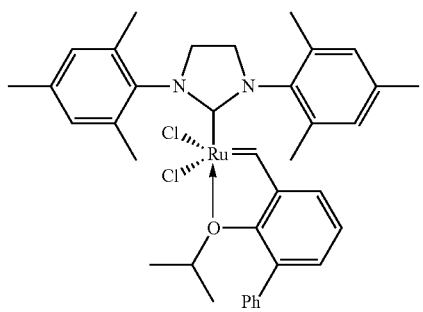
C884
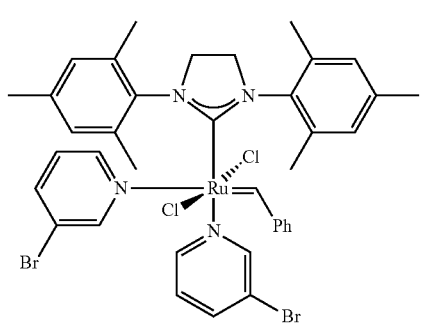

-continued

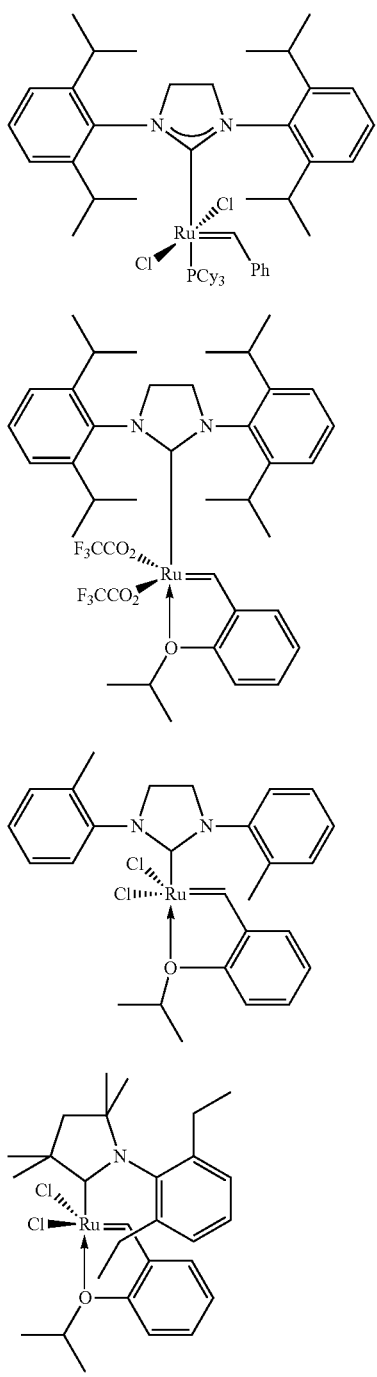

C933

C866

C571

C578

In the foregoing molecular structures and formulae, Ph represents phenyl, Cy represents cyclohexane, Me represents methyl, nBu represents n-butyl, i-Pr represents isopropyl, py represents pyridine (coordinated through the N atom), and Mes represents mesityl (i.e., 2,4,6-trimethylphenyl).

Further examples of catalysts useful in the reactions of the present disclosure include the following: ruthenium (II) dichloro(3-methyl-1,2-butenylidene) bis(tricyclopentylphosphine) (C716); ruthenium (II) dichloro(3-methyl-1,2-butenylidene)bis(tricyclohexylphosphine) (C801); ruthenium (II) dichloro(phenylmethylene)bis(tricyclohexyl phosphine) (C823); ruthenium (II) [1,3-bis-(2,4,6-trimethylphenyl)-2-imidazolidinylidene)dichloro(phenylmethylene)(triphenylphosphine) (C830), and ruthenium (II) dichloro(vinyl phenylmethylene)bis(tricyclohexylphosphine) (C835); ruthenium (II) dichloro(tricyclohexylphosphine)(o-isopropoxyphenylmethylene) (C601), and ruthenium (II) (1,3-bis-(2, 4, 6,-trimethylphenyl)-2-imidazolidinylidene) dichloro(phenylmethylene)(bis 3-bromopyridine (C884)).

Exemplary ruthenium-based metathesis catalysts include those represented by structures 12 (commonly known as Grubbs's catalyst), 14 and 16. Structures 18, 20, 22, 24, 26, 28, 60, 62, 64, 66, and 68 represent additional ruthenium-based metathesis catalysts. Catalysts C627, C682, C697, C712, and C827 represent still additional ruthenium-based catalysts. General structures 50 and 52 represent additional ruthenium-based metathesis catalysts of the type reported in *Chemical & Engineering News*; Feb. 12, 2007, at pages 37-47. In the structures, Ph is phenyl, Mes is mesityl, py is pyridine, Cp is cyclopentyl, and Cy is cyclohexyl.

Techniques for using the metathesis catalysts are known in the art (see, for example, U.S. Pat. Nos. 7,102,047; 6,794,534; 6,696,597; 6,414,097; 6,306,988; 5,922,863; 5,750,815; and metathesis catalysts with ligands in U.S. Publication No. 2007/0004917 A1), all incorporated by reference herein in their entireties. A number of the metathesis catalysts as shown are manufactured by Materia, Inc. (Pasadena, Calif.).

Additional exemplary metathesis catalysts include, without limitation, metal carbene complexes selected from the group consisting of molybdenum, osmium, chromium, rhenium, and tungsten. The term "complex" refers to a metal atom, such as a transition metal atom, with at least one ligand or complexing agent coordinated or bound thereto. Such a ligand typically is a Lewis base in metal carbene complexes useful for alkyne- or alkene-metathesis. Typical examples of such ligands include phosphines, halides and stabilized carbenes. Some metathesis catalysts may employ plural metals or metal co-catalysts (e.g., a catalyst comprising a tungsten halide, a tetraalkyl tin compound, and an organoaluminum compound).

An immobilized catalyst can be used for the metathesis process. An immobilized catalyst is a system comprising a catalyst and a support, the catalyst associated with the support. Exemplary associations between the catalyst and the support may occur by way of chemical bonds or weak interactions (e.g. hydrogen bonds, donor acceptor interactions) between the catalyst, or any portions thereof, and the support or any portions thereof. Support is intended to include any material suitable to support the catalyst. Typically, immobilized catalysts are solid phase catalysts that act on liquid or gas phase reactants and products. Exemplary supports are polymers, silica or alumina. Such an immobilized catalyst may be used in a flow process. An immobilized catalyst can simplify purification of products and recovery of the catalyst so that recycling the catalyst may be more convenient.

The metathesis process can be conducted under any conditions adequate to produce the desired metathesis products. For example, stoichiometry, atmosphere, solvent, temperature and pressure can be selected to produce a desired product and to minimize undesirable byproducts. The metathesis process may be conducted under an inert atmosphere. Similarly, if a reagent is supplied as a gas, an inert gaseous diluent can be used. The inert atmosphere or inert gaseous diluent typically is an inert gas, meaning that the gas does not interact with the metathesis catalyst to substantially impede catalysis. For example, particular inert gases are selected from the group consisting of helium, neon, argon, nitrogen and combinations thereof.

Similarly, if a solvent is used, the solvent chosen may be selected to be substantially inert with respect to the metathesis catalyst. For example, substantially inert solvents include, without limitation, aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc.

In certain embodiments, a ligand may be added to the metathesis reaction mixture. In many embodiments using a ligand, the ligand is selected to be a molecule that stabilizes the catalyst, and may thus provide an increased turnover number for the catalyst. In some cases the ligand can alter reaction selectivity and product distribution. Examples of ligands that can be used include Lewis base ligands, such as, without limitation, trialkylphosphines, for example tricyclohexylphosphine and tributyl phosphine; triarylphosphines, such as triphenylphosphine; diarylalkylphosphines, such as, diphenylcyclohexylphosphine; pyridines, such as 2,6-dimethylpyridine, 2,4,6-trimethylpyridine; as well as other Lewis basic ligands, such as phosphine oxides and phosphinites. Additives also may be present during metathesis that increase catalyst lifetime.

The metathesis reaction temperature may be a rate-controlling variable where the temperature is selected to provide a desired product at an acceptable rate. The metathesis temperature may be greater than −40° C., may be greater than about −20° C., and is typically greater than about 0° C. or greater than about 20° C. Typically, the metathesis reaction temperature is less than about 150° C., typically less than about 120° C. An exemplary temperature range for the metathesis reaction ranges from about 20° C. to about 120° C.

The metathesis reaction can be run under any desired pressure. Typically, it will be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than about 10 kPa, in some embodiments greater than about 30 kPa, or greater than about 100 kPa. Typically, the reaction pressure is no more than about 7000 kPa, in some embodiments no more than about 3000 kPa. An exemplary pressure range for the metathesis reaction is from about 100 kPa to about 3000 kPa.

In some embodiments, the metathesis reaction is catalyzed by a system containing both a transition and a non-transition metal component. The most active and largest number of catalyst systems are derived from Group VI A transition metals, for example, tungsten and molybdenum.

In some embodiments, the unsaturated polyol ester is partially hydrogenated before it is subjected to the metathesis reaction. Partial hydrogenation of the unsaturated polyol ester reduces the number of double bonds that are available for in the subsequent metathesis reaction. In some embodiments, the unsaturated polyol ester is metathesized to form a metathesized unsaturated polyol ester, and the metathesized unsaturated polyol ester is then hydrogenated (e.g., partially or fully hydrogenated) to form a hydrogenated metathesized unsaturated polyol ester.

Hydrogenation may be conducted according to any known method for hydrogenating double bond-containing compounds such as vegetable oils. In some embodiments, the unsaturated polyol ester or metathesized unsaturated polyol ester is hydrogenated in the presence of a nickel catalyst that has been chemically reduced with hydrogen to an active state. Commercial examples of supported nickel hydrogenation catalysts include those available under the trade designations "NYSOFACT", "NYSOSEL", and "NI 5248 D" (from Englehard Corporation, Iselin, N.H.). Additional supported nickel hydrogenation catalysts include those commercially available under the trade designations "PRICAT 9910", "PRICAT 9920", "PRICAT 9908", "PRICAT 9936" (from Johnson Matthey Catalysts, Ward Hill, Mass.).

The hydrogenation catalyst may comprise, for example, nickel, copper, palladium, platinum, molybdenum, iron, ruthenium, osmium, rhodium, or iridium. Combinations of metals also may be used. Useful catalyst may be heterogeneous or homogeneous. In some embodiments, the catalysts are supported nickel or sponge nickel type catalysts.

In some embodiments, the hydrogenation catalyst comprises nickel that has been chemically reduced with hydrogen to an active state (i.e., reduced nickel) provided on a support. The support may comprise porous silica (e.g., kieselguhr, infusorial, diatomaceous, or siliceous earth) or alumina. The catalysts are characterized by a high nickel surface area per gram of nickel.

The particles of supported nickel catalyst may be dispersed in a protective medium comprising hardened triacylglyceride, edible oil, or tallow. In an exemplary embodiment, the supported nickel catalyst is dispersed in the protective medium at a level of about 22 weight % nickel.

The supported nickel catalysts may be of the type described in U.S. Pat. No. 3,351,566 (Taylor et al.), and incorporated by reference herein. These catalysts comprise solid nickel-silica having a stabilized high nickel surface area of 45 to 60 sq. meters per gram and a total surface area of 225 to 300 sq. meters per gram. The catalysts are prepared by precipitating the nickel and silicate ions from solution such as nickel hydrosilicate onto porous silica particles in such proportions that the activated catalyst contains 25 weight % to 50 weight % nickel and a total silica content of 30 weight % to 90 weight %. The particles are activated by calcining in air at 600° F. to 900° F., then reducing with hydrogen.

Useful catalysts having a high nickel content are described in EP 0 168 091 (incorporated by reference herein), wherein the catalyst is made by precipitation of a nickel compound. A soluble aluminum compound is added to the slurry of the precipitated nickel compound while the precipitate is maturing. After reduction of the resultant catalyst precursor, the reduced catalyst typically has a nickel surface area of the order of 90 to 150 sq. m per gram of total nickel. The catalysts have a nickel/aluminum atomic ratio in the range of 2 to 10 and have a total nickel content of more than about 66 weight %.

Useful high activity nickel/alumina/silica catalysts are described in EP 167,201. The reduced catalysts have a high nickel surface area per gram of total nickel in the catalyst. Useful nickel/silica hydrogenation catalysts are described in U.S. Pat. No. 6,846,772. The catalysts are produced by heating a slurry of particulate silica (e.g. kieselguhr) in an aqueous nickel amine carbonate solution for a total period of at least 200 minutes at a pH above 7.5, followed by filtration, washing, drying, and optionally calcination. The nickel/silica hydrogenation catalysts are reported to have improved filtration properties. U.S. Pat. No. 4,490,480 reports high surface area nickel/alumina hydrogenation catalysts having a total nickel content of 5% to 40% weight.

Commercial examples of supported nickel hydrogenation catalysts include those available under the trade designations "NYSOFACT", "NYSOSEL", and "NI 5248 D" (from Englehard Corporation, Iselin, N.H.). Additional supported nickel hydrogenation catalysts include those commercially available under the trade designations "PRICAT 9910", "PRICAT 9920", "PRICAT 9908", "PRICAT 9936" (from Johnson Matthey Catalysts, Ward Hill, Mass.).

Hydrogenation may be carried out in a batch or in a continuous process and may be partial hydrogenation or complete hydrogenation. In a representative batch process, a vacuum is pulled on the headspace of a stirred reaction vessel and the reaction vessel is charged with the material to be hydrogenated (e.g., RBD soybean oil or metathesized RBD soybean oil). The material is then heated to a desired temperature. Typically, the temperature ranges from about 50° C. to 350° C., for example, about 100° C. to 300° C. or about 150° C. to 250° C. The desired temperature may vary, for example, with hydrogen gas pressure. Typically, a higher gas pressure will require a lower temperature. In a separate container, the hydrogenation catalyst is weighed into a mixing vessel and is slurried in a small amount of the material to be hydrogenated (e.g., RBD soybean oil or metathesized RBD soybean oil). When the material to be hydrogenated reaches the desired temperature, the slurry of hydrogenation catalyst is added to the reaction vessel. Hydrogen gas is then pumped into the reaction vessel to achieve a desired pressure of $H_2$ gas. Typically, the $H_2$ gas pressure ranges from about 15 to 3000 psig, for example, about 15 psig to 90 psig. As the gas pressure increases, more specialized high-pressure processing equipment may be required. Under these conditions the hydrogenation reaction begins and the temperature is allowed to increase to the desired hydrogenation temperature (e.g., about 120° C. to 200° C.) where it is maintained by cooling the reaction mass, for example, with cooling coils. When the desired degree of hydrogenation is reached, the reaction mass is cooled to the desired filtration temperature.

The amount of hydrogenation catalyst is typically selected in view of a number of factors including, for example, the type of hydrogenation catalyst used, the amount of hydrogenation catalyst used, the degree of unsaturation in the material to be hydrogenated, the desired rate of hydrogenation, the desired degree of hydrogenation (e.g., as measure by iodine value (IV)), the purity of the reagent, and the $H_2$ gas pressure. In some embodiments, the hydrogenation catalyst is used in an amount of about 10 weight % or less, for example, about 5 weight % or less or about 1 weight % or less.

After hydrogenation, the hydrogenation catalyst may be removed from the hydrogenated product using known techniques, for example, by filtration. In some embodiments, the hydrogenation catalyst is removed using a plate and frame filter such as those commercially available from Sparkler Filters, Inc., Conroe Tex. In some embodiments, the filtration is performed with the assistance of pressure or a vacuum. In order to improve filtering performance, a filter aid may be used. A filter aid may be added to the metathesized product directly or it may be applied to the filter. Representative examples of filtering aids include diatomaceous earth, silica, alumina, and carbon. Typically, the filtering aid is used in an amount of about 10 weight % or less, for example, about 5 weight % or less or about 1 weight % or less. Other filtering techniques and filtering aids also may be employed to remove the used hydrogenation catalyst. In other embodiments the hydrogenation catalyst is removed using centrifugation followed by decantation of the product.

The invention will now be described with reference to the following non-limiting examples.

EXAMPLES

Example 1

In this example, the feedstock was heated to 200° C. to degrade and diminish catalyst poisons from the feedstock. The thermal treatment procedure began by filling a 1 liter bottom sample port reactor with 400 g feedstock of Cognis Undistilled Canola Fatty Acid Methyl Ester (FAME), MF-CNF6C02. The feedstock was then stirred in the reactor with an agitator. A vacuum was pulled on the flask to degas, followed by a nitrogen sparge. Slowly, the feedstock was heated while maintaining the best vacuum possible. Samples were taken when the feedstock reached 45, 75, 150, and 200° C. to analyze for peroxide value (PV). The feedstock was then held at 200° C. Samples and tests for PV were run until PV was less than 0.5 meq/kg. Tests for PV were run using the American Oil Chemists Society (AOCS) Method Cd 8b-90. Subsequently, the feedstock was removed from its heating source, and was cooled with air and an ice bath. The nitrogen sparge was then stopped when the feedstock reached 40° C. The treated feedstock was then placed in a 250 ml narrow mouth amber jar and one clear jar, wherein the feedstock was nitrogen sparged for 5 minutes, headspace blanketed for 1 minute, capped, and sealed.

The treated feedstock, as specified below in Table 1, was subsequently subjected to a self-metathesis reaction in the presence of ruthenium metathesis catalyst 827. Varying amounts of the metathesis catalyst were used in these reactions, as specified in Table 1. The feedstock and catalyst mixture were stirred at 70° C. for 2 hours and subsequently cooled to room temperature. The percent conversion from feedstock to transesterified products was determined by the GC-analysis of transesterified products, as described below.

A 2 mL glass scintillation vial containing a magnetic stirrer was charged with methathesized SBO (~50 mg) and 2 mL of 1% w/w sodium methozide in methanol. The light yellow heterogeneous mixture was stirred at 60° C. for 1 hr. Towards the end of the hour, the mixture turned a homogeneous orange color. To the esterified products was added 2.0 mL DI-$H_2O$ and 2.0 mL ethyl acetate, mixed and the phases separated. The organic phase was diluted with ethyl acetate for GC analysis.

The GC analysis conditions were: [column: HP-5™ (30 m×0.25 mm ID, 0.25 um film thickness)]; 100° C. for 1 min, 10° C./min to 250° C., hold for 12 min.; Rt 12.6 min (Methyl Palmitate), Rt 14.2~14.5 min (Methyl Linolenate, Methyl Linoleate, and Methyl Oleate), Rt 14.7 min (Methyl Stearate).

The degree to which the feedstock has been metathesized is shown in percent conversion. Percent conversion was calculated from the GC chromatogram as 100% minus the sum of methyl palmitate, methyl linolenate (cis and trans isomers), methyl linoleate (cis and trans isomers), methyl oleate (cis and trans isomers) and methyl stearate. Additionally, samples and tests for peroxide value (PV) were run using the American Oil Chemists Society (AOCS) Method Cd 8b-90. The final peroxide value for each sample, along with the percent conversion, is shown in Table 1.

TABLE 1

| Exp # | type of FAME | starting material treatment | metathesis catalyst 827 (ppm/db) | PV value (meq/kg) | GC % conversion |
|---|---|---|---|---|---|
| 109-054A | Canola | none | 30 | 8.6 | 68 |
| 109-054B | Canola | none | 15 | 8.6 | 12 |
| 109-054C | Canola | none | 5 | 8.6 | 6 |
| 109-057A | Canola | none | 2 | 8.6 | 4 |
| 109-054D | Canola | Thermal - 200° C. | 30 | 0.5 | 66 |
| 109-054E | Canola | Thermal - 200° C. | 15 | 0.5 | 67 |
| 109-054F | Canola | Thermal - 200° C. | 5 | 0.5 | 43 |
| 109-057B | Canola | Thermal - 200° C. | 2 | 0.5 | 14 |
| 109-055A | Canola | none | 30 | 8.6 | 64 |

TABLE 1-continued

| Exp # | type of FAME | starting material treatment | metathesis catalyst 827 (ppm/db) | PV value (meq/kg) | GC % conversion |
|---|---|---|---|---|---|
| 109-055B | Canola | none | 15 | 8.6 | 9 |
| 109-055C | Canola | none | 5 | 8.6 | 2 |
| 109-055D | Canola | Thermal - 200° C. | 30 | 0.4 | 66 |
| 109-055E | Canola | Thermal - 200° C. | 15 | 0.4 | 68 |
| 109-055F | Canola | Thermal - 200° C. | 5 | 0.4 | 55 |
| 109-049A | Soy | none | 30 | 10.2 | 69 |
| 109-049B | Soy | none | 15 | 10.2 | 68 |
| 109-049C | Soy | none | 5 | 10.2 | 11 |
| 109-056A | Soy | none | 2 | 10.2 | 2 |
| 109-049D | Soy | Thermal - 200° C. | 30 | 0.4 | 70 |
| 109-049E | Soy | Thermal - 200° C. | 15 | 0.4 | 69 |
| 109-049F | Soy | Thermal - 200° C. | 5 | 0.4 | 69 |
| 109-056B | Soy | Thermal - 200° C. | 2 | 0.4 | 22 |
| 109-050A | Soy | none | 30 | 10.3 | 68 |
| 109-050B | Soy | none | 15 | 10.3 | 67 |
| 109-050C | Soy | none | 5 | 10.3 | 16 |
| 109-050D | Soy | Thermal - 200° C. | 30 | 0.5 | 69 |
| 109-050E | Soy | Thermal - 200° C. | 15 | 0.5 | 68 |
| 109-050F | Soy | Thermal - 200° C. | 5 | 0.5 | 67 |

Table 1 displays the marked improvements that thermal treatment can have over a natural oil feedstock such as canola oil or soybean oil. In both feedstock examples, the feedstock conversion improves after the peroxides and other impurities have been treated. Experimental data shows that an excessive amount of metathesis catalyst (15 to 30 catalyst per mol of carbon-carbon double bonds in the feedstock, or "ppm/db") may reach a maximum theoretical conversion limit regardless of the catalyst poison level. In this example, self-metathesis reactions of the fatty acid methyl esters of canola and soybean oil reach apparent maximum theoretical conversion limits of approximately 68% and 69%, respectively. As the level of catalyst is lowered below 15 ppm/db, the untreated feedstock has a lower conversion, while the thermally treated feedstock has a much improved conversion. The data also shows that at some point, the conversion rate drops considerably due to the low ratio of catalyst to feedstock (2-5 ppm/db).

For canola oil, no treatment of the feedstock with 5 ppm/db catalyst loadings resulted in conversions of 2 and 6% of the feedstock (or approximately 3-9% conversion of the maximum theoretical conversion limit). Heating the canola oil to 200° C. resulted in conversions of 43 and 55% of the feedstock for similar 5 ppm/db catalyst loadings. This equates to approximately 63-81% conversion of the maximum theoretical limit. Basically, the thermal treatment improved conversion approximately 10-fold for canola oil due to thermal treatment.

For soybean oil, no treatment of the feedstock with 5 ppm/db catalyst loadings resulted in conversions of 11 and 16% of the feedstock (or approximately 16-23% conversion of the maximum theoretical limit). Heating the soybean oil to 200° C. resulted in conversions of 69 and 67% for similar 5 ppm/db catalyst loadings, or approximately 97-100% of the maximum theoretical limit). This is approximately a 5-fold improvement in conversion for soybean oil.

Example 2

In this example, a thermal treatment was combined with an adsorbent treatment to further increase catalyst activity or turnover. The treatment began by filling a 3-neck 500 mL round bottom flask with 300 g feedstock of Fatty Acid Methyl Ester (FAME). The feedstock was then stirred in the flask with a stir bar. A nitrogen sparge began as the feedstock is heated to 45° C. The feedstock was held at 45° C. for 45 minutes to degas. Slowly, the feedstock was heated to a target of 200° C. Samples were taken when the feedstock reached 45, 75, 150, and 200° C. to analyze for peroxide value (PV). The feedstock was then held at 200° C. Samples and tests for PV were run until PV was less than 0.5 meq/kg. Tests for PV were run using the American Oil Chemists Society (AOCS) Method Cd 8b-90.

Subsequently, 2.5 wt % magnesium silicate (Magnesol) and 1.25 wt % Celite were added to the flask. The feedstock was cooled to 80° C., and then held at 80° C. for 1 hour to allow the magnesium silicate to adsorb. The feedstock was then cooled to 40° C., at which point the nitrogen sparge was stopped. The treated feedstock was filtered through #4 paper on a Buchner funnel to separate adsorbent from the feedstock. Twice more, the feedstock was filtered through a Buchner funnel with #2 filter paper. The treated and filtered feedstock were then stored in two 125 mL amber bottles and 1 clear jar, nitrogen sparged, blanketed, and sealed.

The treated feedstock then followed a similar metathesis reaction with a ruthenium metathesis catalyst 827, and conversion results were measured through a GC-analysis. Table 2 displays the results below.

TABLE 2

| Exp # | type of FAME | starting material treatment | metathesis catalyst 827 (ppm/db) | PV value (meq/kg) | GC % conversion |
|---|---|---|---|---|---|
| 109-054A | Canola | none | 30 | 8.6 | 68 |
| 109-054B | Canola | none | 15 | 8.6 | 12 |
| 109-054C | Canola | none | 5 | 8.6 | 6 |
| 109-057A | Canola | none | 2 | 8.6 | 4 |
| 109-054D | Canola | Thermal - 200° C. | 30 | 0.5 | 66 |
| 109-054E | Canola | Thermal - 200° C. | 15 | 0.5 | 67 |
| 109-054F | Canola | Thermal - 200° C. | 5 | 0.5 | 43 |
| 109-057B | Canola | Thermal - 200° C. | 2 | 0.5 | 14 |
| 109-054G | Canola | Thermal + 2.5 wt % Magnesol | 30 | 0.7 | 63 |
| 109-054H | Canola | Thermal + 2.5 wt % Magnesol | 15 | 0.7 | 64 |
| 109-054I | Canola | Thermal + 2.5 wt % Magnesol | 5 | 0.7 | 67 |
| 109-057C | Canola | Thermal + 2.5 wt % Magnesol | 2 | 0.7 | 55 |
| 109-055A | Canola | none | 30 | 8.6 | 64 |
| 109-055B | Canola | none | 15 | 8.6 | 9 |
| 109-055C | Canola | none | 5 | 8.6 | 2 |
| 109-055D | Canola | Thermal - 200° C. | 30 | 0.4 | 66 |
| 109-055E | Canola | Thermal - 200° C. | 15 | 0.4 | 68 |
| 109-055F | Canola | Thermal - 200° C. | 5 | 0.4 | 55 |
| 109-055G | Canola | Thermal + 1 wt % Magnesol | 30 | 0.7 | 65 |
| 109-055H | Canola | Thermal + 1 wt % Magnesol | 15 | 0.7 | 67 |
| 109-055I | Canola | Thermal + 1 wt % Magnesol | 5 | 0.7 | 69 |
| 109-057D | Canola | Thermal + 1 wt % Magnesol | 2 | 0.7 | 39 |
| 109-049A | Soy | none | 30 | 10.2 | 69 |
| 109-049B | Soy | none | 15 | 10.2 | 68 |
| 109-049C | Soy | none | 5 | 10.2 | 11 |
| 109-056A | Soy | none | 2 | 10.2 | 2 |
| 109-049D | Soy | Thermal - 200° C. | 30 | 0.4 | 70 |
| 109-049E | Soy | Thermal - 200° C. | 15 | 0.4 | 69 |
| 109-049F | Soy | Thermal - 200° C. | 5 | 0.4 | 69 |
| 109-056B | Soy | Thermal - 200° C. | 2 | 0.4 | 22 |
| 109-049G | Soy | Thermal + 2.5 wt % Magnesol | 30 | 0.6 | 70 |
| 109-049H | Soy | Thermal + 2.5 wt % Magnesol | 15 | 0.6 | 69 |
| 109-049I | Soy | Thermal + 2.5 wt % Magnesol | 5 | 0.6 | 69 |

TABLE 2-continued

| Exp # | type of FAME | starting material treatment | metathesis catalyst 827 (ppm/db) | PV value (meq/ kg) | GC % conversion |
|---|---|---|---|---|---|
| 109-056C | Soy | Thermal + 2.5 wt % Magnesol | 2 | 0.6 | 51 |
| 109-050A | Soy | none | 30 | 10.3 | 68 |
| 109-050B | Soy | none | 15 | 10.3 | 67 |
| 109-050C | Soy | none | 5 | 10.3 | 16 |
| 109-050D | Soy | Thermal - 200° C. | 30 | 0.5 | 69 |
| 109-050E | Soy | Thermal - 200° C. | 15 | 0.5 | 68 |
| 109-050F | Soy | Thermal - 200° C. | 5 | 0.5 | 67 |
| 109-050G | Soy | Thermal + 1 wt % Magnesol | 30 | 0.8 | 69 |
| 109-050H | Soy | Thermal + 1 wt % Magnesol | 15 | 0.8 | 68 |
| 109-050I | Soy | Thermal + 1 wt % Magnesol | 5 | 0.8 | 67 |
| 109-056D | Soy | Thermal + 1 wt % Magnesol | 2 | 0.8 | 48 |

As shown in Table 2, improvements exist between thermal plus adsorbent treatment and thermal treatment alone, especially at low metathesis catalyst levels (5 ppm/db and less). In both feedstock examples, the feedstock conversion improves after the peroxides and other impurities have been treated. Experimental data shows that an excessive amount of metathesis catalyst (15 to 30 ppm catalyst per mol of carbon-carbon double bonds in the feedstock, or "ppm/db") may reach a maximum theoretical conversion limit regardless of the catalyst poison level. In this example, self-metathesis reactions of the fatty acid methyl esters of canola and soybean oil reach apparent maximum theoretical conversion limits of approximately 69% and 70%, respectively. As the level of catalyst is lowered below 15 ppm/db, untreated feedstock has a poor conversion, while the thermally treated feedstock has an improved conversion, and the thermal plus adsorbent treatment is even more improved. In other words, a thermal plus adsorbent treatment can use a lower amount of metathesis catalyst to achieve the desired conversion, in comparison to thermal treatment only.

For canola oil, no treatment of the feedstock with a 2 ppm/db catalyst loading resulted in a 2% conversion of the feedstock (or approximately 3% conversion of the maximum theoretical conversion limit). Heating the canola oil to 200° C. resulted in a 14% conversion of the feedstock (or approximately 20% conversion of the maximum theoretical limit) for a similar 2 ppm/db catalyst loading. Adding 2.5 wt % magnesium silicate after the heating step boosted conversion to 55% (or approximately 80% conversion of the maximum theoretical limit), a four-fold improvement over thermal treatment alone. Alternatively, adding only 1 wt % magnesium silicate after the heating step resulted in a conversion of 39% (or approximately 57% conversion of the maximum theoretical limit), nearly a three-fold improvement over thermal treatment alone.

For soybean oil, no treatment of the feedstock with a 2 ppm/db catalyst loading resulted in a conversion of 4% (or approximately 6% conversion of the maximum theoretical limit). Heating the soybean oil to 200° C. resulted in a conversion of 22% (or approximately 31% conversion of the maximum theoretical limit) for a similar 2 ppm/db catalyst loading. Adding 2.5 wt % magnesium silicate after the heating step boosted conversion to 51% (or approximately 73% conversion of the maximum theoretical limit), more than a two-fold improvement over thermal treatment alone. Alternatively, adding only 1 wt % magnesium silicate after the heating step resulted in a conversion of 48% (or approximately 69% conversion of the maximum theoretical limit), more than a two-fold improvement over thermal treatment alone.

Example 3

In this example, the feedstock was treated by an adsorbent only to demonstrate that additional non-peroxide catalyst poisons are present in natural oil feedstocks in addition to peroxides. The feedstock (FAME) was treated with either bleaching clay or magnesium silicate (Magnesol). The results are shown in Table 3.

TABLE 3

| Exp # | type of FAME | starting material treatment | metathesis catalyst 827 (ppm/db) | PV value (meq/ kg) | GC % conversion |
|---|---|---|---|---|---|
| 109-014E2 | Soy | 2.5 wt. % bleaching clay | 3 | 0.3 | 28 |
| 109-006F1 | Soy | 1 wt. % Magnesol | 3 | 3.8 | 45 |
| 109-014B2 | Canola | 2.5 wt. % bleaching clay | 4 | 0.7 | 8 |
| 109-006B1 | Canola | 2.5 wt. % Magnesol | 4 | 2.2 | 36 |

As shown in Table 3, when the canola and soybean feedstocks are treated with 2.5 wt % bleaching clay, both feedstocks have peroxide values of less than 1 meq/kg, but the product conversions are 8% and 28% (or 11% and 40% conversion of the maximum theoretical limit, assuming a limit of 70%) for canola and soybean oil feedstocks, respectively. Instead, when soybean oil is treated with 1 wt % magnesium silicate, the peroxide value is 3.8 meq/kg and conversion is 45% (or approximately 64% conversion of the maximum theoretical limit) at a 3 ppm/db catalyst loading. When canola oil is treated with 2.5 wt % magnesium silicate, the peroxide value is 2.2 meq/kg and conversion is 36% (or approximately 51% conversion of the maximum theoretical limit) at a 4 ppm/db catalyst loading. Basically, the peroxide values are not reduced as much with the magnesium silicate, but the conversions are higher than with bleaching clay at comparable catalyst loadings for each feedstock. This example proves that non-peroxide poisons have an impact on the overall conversion, since a lower PV doesn't necessarily result in a better conversion. Additionally, this example demonstrates why magnesium silicate is a preferred adsorbent as it appears to be effective at removing some of the non-peroxide catalyst poisons which were missed by the bleaching clay.

Example 4

This example demonstrates, among other things, the presence of non-peroxide poisons in the feedstock. The feedstock had been subjected to thermal treatment or thermal plus adsorbent treatment, following the procedures outlined in Examples 1 and 2, respectively. The comparison is shown in Table 4.

TABLE 4

| Exp # | type of FAME | starting material treatment | metathesis catalyst 827 (ppm/db) | PV value (meq/ kg) | GC % conversion |
|---|---|---|---|---|---|
| 109-056B | Soy | Thermal - 200° C. | 2 | 0.4 | 22 |
| 109-056C | Soy | Thermal + 2.5 wt % Magnesol | 2 | 0.6 | 51 |

As shown in Table 4, thermal treatment at 200° C. results in effective removal of peroxide poisons (0.4 meq/kg), but results in only a 22% product conversion (or approximately 31% conversion of the maximum theoretical limit, assuming a 70% conversion limit) at a relatively low catalyst loading (2 ppm/db). When the natural oil feedstock is subjected to both heat and magnesium silicate, the level of peroxides are at a similar diminished level (0.6 meq/kg), but conversion more than doubles to 51% (or approximately 73% conversion of the maximum theoretical limit, assuming a 70% conversion limit) with a similar 2 ppm/db catalyst loading. This demonstrates that additional poisons are present in the feedstock, and that the poisons may be more effectively diminished when thermal treatment is coupled with adsorbent treatment.

Example 5

This example demonstrates, among other things, that thermal treatment prior to adsorbent treatment is an improvement over adsorbent treatment alone. The comparisons between adsorbent treatment and thermal plus adsorbent treatment are shown below in Table 5.

TABLE 5

| Exp # | type of FAME | starting material treatment | metathesis catalyst 827 (ppm/db) | PV value (meq/ kg) | GC % conversion |
|---|---|---|---|---|---|
| 109-006F1 | Soy | 1 wt % Magnesol | 3 | 3.8 | 45 |
| 109-056D | Soy | Thermal + 1 wt % Magnesol | 2 | 0.8 | 48 |
| 109-006B1 | Canola | 2.5 wt % Magnesol | 4 | 2.2 | 36 |
| 109-057C | Canola | Thermal + 2.5 wt % Magnesol | 2 | 0.7 | 55 |

As shown in Table 5, adsorbent treatment of soybean oil with 1 wt % magnesium silicate followed by self-metathesis in the presence of 3 ppm/db ruthenium catalyst leads to a 45% conversion of the feedstock (or approximately 64% conversion of the maximum theoretical limit, assuming a 70% conversion limit). Alternatively, adsorbent treatment of canola oil with 2.5 wt % magnesium silicate followed by self-metathesis in the presence of 4 ppm/db catalyst leads to a 36% conversion of the feedstock (or approximately 51% conversion of the maximum theoretical limit, assuming a 70% conversion limit). When each feedstock is subjected to both thermal (200° C.) and adsorbent treatment, the peroxide value was diminished below 1 meq/kg. Additionally, the soybean oil achieved 48% conversion of the feedstock (or approximately 69% conversion of the maximum theoretical limit, assuming a 70% conversion limit) with a 33% reduction in catalyst loading. The canola oil achieved 55% conversion of the feedstock (or approximately 79% conversion of the maximum theoretical limit, assuming a 70% conversion limit) with a 50% reduction in catalyst loading. In summary, thermal plus adsorbent treatment may provide increased levels of conversion with lower loadings of metathesis catalyst. As noted, lowering the amount of metathesis catalyst required to achieve the desired conversion is important, as the ruthenium catalyst is typically the most expensive component in the metathesis reaction.

Example 6

This example demonstrates, among other things, that catalyst performance can be improved through thermal plus adsorbent treatment, even for feedstocks having starting peroxide values already lower than 1 meq/kg. Additionally, this example demonstrates that catalyst performance and conversion can be improved dramatically for very low catalyst loadings (i.e. 1-3 ppm/db). In this example, the feedstock comprises fatty acid methyl esters derived from soybean oil supplied by Cargill. The feedstock underwent thermal and adsorbent treatment by heating the feedstock to 200° C. and subsequently subjecting the feedstock to 2.5 wt % magnesium silicate.

| Exp # | type of FAME | starting material treatment | metathesis catalyst 827 (ppm/db) | PV value (meq/ kg) | GC % conversion |
|---|---|---|---|---|---|
| Round 3 - Biodiesel | Soy | none | 3 | 0.86 | 22 |
| Round 3 - Exp. B8 | Soy | Thermal + 2.5 wt % Magnesol | 3 | 0.55 | 69 |
| Round 3 - Exp. B8 | Soy | Thermal + 2.5 wt % Magnesol | 2 | 0.55 | 66 |
| Round 3 - Exp. B8 | Soy | Thermal + 2.5 wt % Magnesol | 1 | 0.55 | 48 |

As shown in Table 6, improvements in conversion may be possible for feedstocks with low starting peroxide values (i.e. <1 meq/kg). Experimental data shows that no treatment of the fatty acid methyl ester feedstock derived from soybean oil resulted in a conversion of 22% of the feedstock at a catalyst loading of 3 ppm/db. Assuming a maximum theoretical conversion limit of approximately 70%, this equates to approximately 31% conversion of the maximum theoretical limit. When this low peroxide value feedstock is subjected to a thermal plus adsorbent treatment, the peroxide value decreases slightly from 0.86 to 0.55 meq/kg. At a 3 ppm/db catalyst loading, the conversion increases to 69%, or approximately 99% of the maximum theoretical conversion limit (assuming a 70% maximum theoretical limit). At a 2 ppm/db catalyst loading, the feedstock conversion is 66%, or approximately 94% of the maximum theoretical conversion limit (assuming a 70% maximum theoretical limit). At a very low 1 ppm/db catalyst loading, the feedstock conversion is 48%, or roughly 69% of the maximum theoretical conversion limit (assuming a 70% maximum theoretical limit). These results were unexpected, considering the starting peroxide value of the feedstock was below 1 meq/kg. The ability to use such a low amount of catalyst (1 ppm/db of catalyst) and achieve more than twice the conversion than a 3 ppm/db catalyst loading is highly desirable.

While the present invention has been described in terms of preferred examples, it will be understood, of course, that the invention is not limited thereto since modifications may be made to those skilled in the art, particularly in light of the foregoing teachings.

What is claimed is:

1. A method of metathesizing a feedstock comprising:
providing a feedstock comprising a natural oil;
heating the feedstock to a temperature greater than 100° C. in the absence of oxygen;
holding the feedstock at the temperature for a time sufficient to diminish catalyst poisons in the feedstock; and
following the heating and holding, combining a metathesis catalyst with the feedstock under conditions sufficient to metathesize the feedstock.

2. A method of metathesizing a feedstock comprising:
providing a feedstock comprising a natural oil;
heating the feedstock to a temperature greater than 100° C. in the absence of oxygen;
holding the feedstock at the temperature for a time sufficient to diminish catalyst poisons in the feedstock;
combining an adsorbent material with the feedstock to diminish catalyst poisons in the feedstock; and
following the heating, the holding, and the combining steps, combining a metathesis catalyst with the feedstock under conditions sufficient to metathesize the feedstock.

3. The method of claim 2, wherein the adsorbent is combined in an amount between approximately 0.1 and 3.0 wt % of the feedstock.

4. The method of claim 3, wherein the adsorbent is combined in an amount between approximately 0.2 and 2.0 wt % of the feedstock.

5. The method of claim 1, wherein the temperature is less than or equal to 300° C.

6. The method of claim 1, wherein the temperature is between approximately 120° C. and 250° C.

7. The method of claim 1, wherein the temperature is between approximately 150° C. and 210° C.

8. A method of metathesizing a feedstock comprising:
providing a feedstock comprising a natural oil;
heating the feedstock to a temperature greater than 100° C. in the absence of oxygen;
holding the feedstock at the temperature for a time sufficient to diminish catalyst poisons in the feedstock;
cooling the feedstock below approximately 40° C.
following the cooling, combining a metathesis catalyst with the feedstock under conditions sufficient to metathesize the feedstock.

9. The method of claim 1, wherein the metathesis reaction comprises a maximum theoretical conversion limit, and wherein the metathesis catalyst catalyzes the metathesis of at least 50% of the maximum theoretical conversion limit.

10. The method of claim 9, wherein the metathesis catalyst metathesizes at least 70% of the maximum theoretical conversion limit.

11. The method of claim 9, having a catalyst loading of approximately 5 ppm/db or less.

12. The method of claim 11, wherein the catalyst loading is approximately 2 ppm/db or less.

13. The method of claim 9, wherein the metathesis catalyst metathesizes at least 85% conversion of the maximum theoretical conversion limit.

14. The method of claim 1, wherein the feedstock comprises a starting peroxide value of approximately greater than 5 meq/kg and the heating decreases the starting peroxide value of the feedstock to approximately 1 meq/kg or less.

15. The method of claim 14, wherein the heating comprises decreasing the starting peroxide value of the feedstock to approximately 0.5 meq/kg or less.

16. The method of claim 1 comprising any two or more of the following:
the combining comprises a catalyst loading of approximately 5 ppm/db or less, or approximately 3 ppm/db or less, or approximately 2 ppm/db or less, or approximately 1 ppm/db or less;
the metathesis reaction comprises a maximum theoretical conversion limit and the metathesis catalyst catalyzes the metathesis of at least 50 wt %, at least 70%, or at least 85% of the maximum theoretical conversion limit;
the temperature is between 100° C. and 300° C., or between 100° C. and 250° C., or between 150° C. and 210° C., or about 200° C.;
the feedstock comprises a starting peroxide value of greater than 5 meq/kg, or greater than 10 meq/kg;
the heating decreases the peroxide value of the feedstock to a value of approximately 1 meq/kg or less or approximately 0.5 meq/kg or less;
after the heating, the feedstock is cooled to a temperature below approximately 40° C. prior to the combining of the metathesis catalyst with the feedstock;
combining an adsorbent material with the feedstock to diminish the catalyst poisons in the feedstock, wherein the adsorbent material is selected from the group consisting of silica gel, bleaching clay, activated carbon, charcoal, molecular sieves, zeolites, Fuller's earth, neutral alumina, basic alumina, Celite, aluminum sulfate, calcium carbonate, Kaolin, magnesium sulfate, potassium chloride, potassium magnesium sulfate, magnesium silicate, potassium sulfate, soda ash, sodium carbonate, and sodium sulfate;
combining an adsorbent material in an amount between approximately 0.1 and 3.0 wt % or between approximately 0.2 and 2.0 wt %; and
the feedstock comprises one or more materials selected from the group consisting of algae oil, canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, castor oil, and natural oil derivatives of any one or more of these.

17. A method of metathesizing a feedstock comprising:
providing a feedstock comprising a natural oil;
heating the feedstock to a temperature greater than 100° C. in the absence of oxygen for a time sufficient to diminish non-peroxide poisons in the feedstock; and
following the heating, combining a metathesis catalyst with the feedstock under conditions sufficient to metathesize the feedstock.

18. A method of metathesizing a feedstock comprising:
providing a feedstock comprising a natural oil or a natural oil derivative, wherein the feedstock has a starting peroxide value;
heating the feedstock to a temperature greater than 100° C. in the absence of oxygen for a time sufficient to diminish the starting peroxide value of the feedstock by approximately 80% or more; and
following the heating, combining a metathesis catalyst with the feedstock under conditions sufficient to metathesize the feedstock.

19. The method of claim 18, wherein the heating diminishes the starting peroxide value of the feedstock by approximately 90% or more.

20. The method of claim 1, wherein the temperature is about 200° C.

* * * * *

UNITED STATES PATENT AND TRADEMARK OFFICE
CERTIFICATE OF CORRECTION

PATENT NO.       : 8,692,006 B2
APPLICATION NO.  : 12/672652
DATED            : April 8, 2014
INVENTOR(S)      : Uptain et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Twenty-ninth Day of September, 2015

Michelle K. Lee
*Director of the United States Patent and Trademark Office*